United States Patent
Struillou et al.

(10) Patent No.: US 12,486,471 B2
(45) Date of Patent: *Dec. 2, 2025

(54) PERFUME FORMULATION FOR DELIVERY SYSTEM

(71) Applicant: FIRMENICH SA, Satigny (CH)

(72) Inventors: Arnaud Struillou, Satigny (CH); Lahoussine Ouali, Satigny (CH); Addi Fadel, Plainsboro, NJ (US); Kitty Van Gruijthuijsen, Satigny (CH)

(73) Assignee: FIRMENICH SA, Satigny (CH)

( * ) Notice: Subject to any disclaimer, the term of this patent is extended or adjusted under 35 U.S.C. 154(b) by 813 days.

This patent is subject to a terminal disclaimer.

(21) Appl. No.: 17/757,396

(22) PCT Filed: Dec. 15, 2020

(86) PCT No.: PCT/EP2020/086267
§ 371 (c)(1),
(2) Date: Jun. 15, 2022

(87) PCT Pub. No.: WO2021/122630
PCT Pub. Date: Jun. 24, 2021

(65) Prior Publication Data
US 2023/0040744 A1     Feb. 9, 2023

Related U.S. Application Data

(60) Provisional application No. 62/950,148, filed on Dec. 19, 2019.

(30) Foreign Application Priority Data

Jan. 31, 2020 (EP) ..................................... 20154990

(51) Int. Cl.
*B01J 13/14*     (2006.01)
*C11B 9/00*     (2006.01)

(52) U.S. Cl.
CPC ................. *C11B 9/00* (2013.01); *B01J 13/14* (2013.01)

(58) Field of Classification Search
CPC ... B01J 13/14; B01J 13/22; B01J 13/10; B01J 13/046; A61K 8/11; C11B 9/00; A61Q 13/00; A61Q 11/00; A61Q 5/10; A61Q 5/12; A61Q 5/02; A61Q 19/10; A61Q 19/00; A61Q 15/00
USPC ....................................................... 512/4, 1
See application file for complete search history.

(56) References Cited

U.S. PATENT DOCUMENTS 6,869,923 B1     3/2005     Cunningham et al.

FOREIGN PATENT DOCUMENTS

WO     WO-2009153695 A1 * 12/2009 ............... B01J 13/16

OTHER PUBLICATIONS

International Search Report and Written Opinion for corresponding PCT/EP2020/086267 mailed Mar. 23, 2021; 10 pages.

* cited by examiner

*Primary Examiner* — Jessica Whiteley
(74) *Attorney, Agent, or Firm* — Armstrong Teasdale LLP

(57) ABSTRACT

Described herein is a delivery system including a carrier and a perfume formulation, where the perfume formulation includes 0 to 60 wt. % of a hydrophobic solvent, 40 to 100 wt. % of a perfume oil, where the perfume oil has at least two of the following characteristics: at least 35% of perfuming ingredients having a log P above 3, at least 20% of Bulky materials of Groups 1 to 6 and at least 15% of high impact perfume materials having a Log T<−4, where the perfume formulation is entrapped in the carrier. Also described herein are perfuming compositions and perfumed consumer products including the delivery system.

17 Claims, No Drawings

PERFUME FORMULATION FOR DELIVERY SYSTEM

CROSS-REFERENCE TO RELATED APPLICATIONS

This application is a U.S. National Phase Application of International Patent Application No. PCT/EP2020/086267, filed Dec. 15, 2020, which claims priority to U.S. Provisional Patent Application No. 62/950,148, filed Dec. 19, 2019, and which claims priority to European Patent Application No. 20154990.4, filed Jan. 31, 2020, the entire contents of which are hereby incorporated by reference herein.

TECHNICAL FIELD OF THE INVENTION

The present invention is in the field of perfume delivery systems. In particular, the present invention relates to a delivery system comprising a carrier and a perfume formulation, wherein the perfume formulation comprises 0 to 60 wt. % of a hydrophobic solvent, 40 to 100 wt. % of a perfume oil, wherein the perfume oil has at least two of the following characteristics: at least 35% of perfuming ingredients having a log P above 3, at least 20% of Bulky materials of groups 1 to 6 and at least 15% of high impact perfume materials having a Log T<−4, wherein the perfume formulation is entrapped in the carrier. Moreover, the present invention relates to perfuming compositions and perfumed consumer products comprising the delivery system according to the present invention.

BACKGROUND OF THE INVENTION

One of the problems faced by the perfumery industry lies in the relatively rapid loss of olfactive benefit provided by odoriferous compounds due to their high volatility, particularly that of "top-notes". In order to tailor the release rates of volatiles, delivery system such as microcapsules containing active ingredients, for example a perfume, are needed to protect and later release the core payload when triggered. A key requirement from the industry regarding these systems is to survive suspension in challenging bases without physically dissociating or degrading. This is referred to as chemical stability of a delivery system. For instance, fragrance personal and household cleansers containing high levels of aggressive surfactant detergents are very challenging for the stability of delivery systems, such as microcapsules. High levels of surfactants also increase the speed of diffusion of actives out of the delivery system, such as a microcapsule. This leads to leakage of the actives during storage and a reduced impact when the microcapsules are triggered to release.

Research for improving the chemical stability for a delivery system and reducing the leakage of a perfume from the delivery system has been mainly focused on the material of the carrier of the delivery system, such as the constitution of the wall of microcapsules.

Even if microcapsules providing chemical stability for a delivery system are known from the prior art, there is still a need in the industry for improving the stability for a delivery system and reducing the leakage of a perfume from the delivery system and preferably providing an improved impact of the perfume upon release to the consumer.

The present invention satisfies these and other needs of the industry.

DETAILED DESCRIPTION OF THE INVENTION

In a first aspect, the present invention relates to a delivery system comprising a carrier and a perfume formulation, wherein the perfume formulation comprises
- 0 to 60 wt. % of a hydrophobic solvent (based on the total weight of the perfume formulation),
- 40 to 100 wt. % of a perfume oil (based on the total weight of the perfume formulation), wherein the perfume oil has at least two of the following characteristics:
  - at least 35%, preferably at least 40%, preferably at least 50%, more preferably at least 60% of perfuming ingredients having a log P above 3, preferably above 3.5,
  - at least 20%, preferably at least 25%, preferably at least 30%, more preferably at least 40% of Bulky materials of groups 1 to 6, preferably 3 to 6 as herein defined and
  - at least 15%, preferably at least 20%, more preferably at least 25%, even more preferably at least 30% of high impact perfume materials having a Log T<−4,
- optionally, further hydrophobic active ingredients, wherein the perfume formulation is entrapped in the carrier.

According to an embodiment, the perfume oil has all of the following characteristics:
- at least 35%, preferably at least 40%, preferably at least 50%, more preferably at least 60% of perfuming ingredients having a log P above 3, preferably above 3.5,
- at least 20%, preferably at least 25%, preferably at least 30%, more preferably at least 40% of Bulky materials of groups 1 to 6, preferably 3 to 6 as herein defined and
- at least 15%, preferably at least 20%, more preferably at least 25%, even more preferably at least 30% of high impact perfume materials having a Log T<−4.

The amounts of ingredients/materials of the perfume oil defined above are given based on the total weight of the perfume oil.

A delivery system is herein understood to protect active ingredients, in particular of a perfume formulation and the perfume comprised within the perfume formulation, and/or to control their release.

By carrier or carrier material is herein understood that the material of the carrier is suitable to entrap, encapsulate or hold a certain amount of perfume formulation. In order to be qualified as a carrier material, the carrier material has to entrap, encapsulate or hold a certain amount of perfume.

Typically, when the delivery system is in a matrix form, the carrier material is a matrix material and the delivery system has to entrap preferably at least 20 wt. %, preferably at least 30 wt. %, even more preferably at least 35 wt. % of the perfume formulation, based on the total weight of the delivery system.

Typically, when the delivery system is in the form a core-shell microcapsule, the carrier is a shell and the delivery system has to entrap preferably at least 80 wt. %, preferably at least 90 wt. %, of the perfume formulation, based on the total weight of the delivery system. Moreover, by holding it is understood that the carrier material does not allow a leakage of more than 40%, preferably not more than 35% of the perfume formulation after 15 days at 37° C.

In a particular embodiment, the carrier or carrier material is a solid carrier material, i.e. an emulsion or solvent is not a carrier or carrier material.

In a particular embodiment, the delivery system is a core-shell microcapsule or the delivery system is in a matrix form (i.e oil entrapped within a polymeric matrix, for example a monomeric, oligomeric or polymeric carrier matrix), preferably wherein the delivery system is a core-shell microcapsule. For the sake of clarity, thereby it is understood that when the delivery system is a core-shell microcapsule, the perfume formulation is comprised in the core which is surrounded or entrapped by the shell. When the delivery system is in the form of a matrix, the perfume formulation is entrapped in a matrix of a carrier, such as a monomeric, oligomeric or polymeric carrier matrix, by adsorption in the matrix.

In case the carrier is a monomeric, oligomeric or polymeric carrier matrix, it is herein understood that the perfume formulation is entrapped in the monomeric, oligomeric or polymeric carrier matrix by adsorption within the monomeric, oligomeric or polymeric carrier matrix, i.e. it is adsorbed in the pores of the monomeric, oligomeric or polymeric carrier matrix.

In a particular embodiment, the carrier material comprises a monomeric, oligomeric or polymeric carrier material, or mixtures of two or more of these.

An oligomeric carrier is a carrier wherein 2-10 monomeric units are linked by covalent bonds. For example, if the oligomeric carrier is a carbohydrate, the oligomeric carrier may be sucrose, lactose, raffinose, maltose, trehalose, fructo-oligosaccharides.

Examples of a monomeric carrier materials are glucose, fructose, mannose, galactose, arabinose, fucose, sorbitol, mannitol, for example.

Polymeric carriers have more than 10 monomeric units that are linked by covalent bonds.

In a particular embodiment, the carrier may be a polymeric carrier material. Non-limiting examples of polymeric carrier material includes polyaspartate, modified polysuccinimides, lignin and its derivatives, polyoxazoline, polyhydroxyalcanoates, polyphenols, natural and synthetic clays, polyvinyl acetates, polyvinyl alcohol, dextrines, maltodextrines, glucose syrups, natural or modified starch, polysaccharides, carbohydrates, chitosan, gum Arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, vegetable gums, gum acacia, pectins, xanthanes, alginates, carragenans or cellulose derivatives, such as carboxymethyl methylcellulose, methylcellulose or hydroxyethyl cellulose; chitin, proteins (animal and vegetal), polyaspartate, poylsuccinimides and its derivatives, polyesters, polyaminoesters, polyhydroxyalkanoates, polycarbonates and mixtures thereof. Preferably the polymeric carrier material comprises natural or modified starch, maltodextrins, carbohydrates, chitin, proteins (animal and vegetal), polyaspartate, poylsuccinimides and its derivatives, polyesters, polyaminoesters, polyhydroxyalkanoates, polycarbonates and mixtures thereof.

The carrier material is preferably present in an amount between 25 and 80 wt. %, preferably between 30 and 60 wt. % and more preferably between 40 and 55 wt. % (based on the total weight of the delivery system).

In a preferred embodiment, the polymeric carrier material may further comprise a fireproofing agent, preferably selected from the group consisting of sodium silicate, potassium silicate, sodium carbonate, sodium hydrogencarbonate, monoammonium phosphate or carbonate, diammonium phosphate, mono-, di- or trisodium phosphate, sodium hypophosphite, melamine cyanurate, chlorinated hydrocarbons, talc and mixtures thereof.

In case the delivery system is a core-shell microcapsule, it is herein understood that the perfume formulation is comprised in the core which is surrounded by a shell wall of the microcapsule.

Thus according to an embodiment, the delivery system is core-shell microcapsules comprising:
an oil based core comprising a perfume formulation,
  wherein the perfume formulation comprises
    0 to 60 wt. % of a hydrophobic solvent (based on the total weight of the perfume formulation),
    40 to 100 wt. % of a perfume oil (based on the total weight of the perfume formulation), wherein the perfume oil has at least two, preferably all of the following characteristics:
      at least 35%, preferably at least 40%, preferably at least 50%, more preferably at least 60% of perfuming ingredients having a log P above 3, preferably above 3.5,
      at least 20%, preferably at least 25%, preferably at least 30%, more preferably at least 40% of Bulky materials of groups 1 to 6, preferably 3 to 6 as herein defined and
      at least 15%, preferably at least 20%, more preferably at least 25%, even more preferably at least 30% of high impact perfume materials having a Log T<−4,
  optionally, further hydrophobic active ingredients, and
a shell surrounding said oil-based core.

The nature of the shell, preferably a polymeric shell, of the microcapsules of the invention can vary.

As non-limiting examples, the shell comprises a material selected from the group consisting of polyurea, polyurethane, polyamide, polyhydroxyalkanoates, polyacrylate, polyesters, polyaminoesters, polyepoxides, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

In a first particular embodiment of the core-shell microcapsules, the core-shell microcapsule comprises an oil-based core comprising the perfume formulation and a composite shell comprising a first material and a second material, wherein the first material and the second material are different, the first material is a coacervate, the second material is a polymeric material.

In a particular embodiment, the weight ratio between the first material and the second material is comprised between 50:50 and 99.9:0.1.

In a particular embodiment, the coacervate comprises a first polyelectrolyte and a second polyelectrolyte.

A first polyelectrolyte (Polyelectrolyte I) of one charge, preferably selected among proteins (such as gelatin), polypeptides or polysaccharides (such as chitosan) that are able to interact with an electrolyte or polyelectrolyte that has an opposite charge to thus form a coacervate phase having the ability to coat hydrophobic interfaces in order to form the capsules. In a preferred embodiment, Polyelectrolyte I is positively charged for pH<8 and optionally forms gels or highly viscous solutions in water below the gelling temperature, and lower viscosity solutions in water at a temperature above the melting point of the gel. The viscosity above the gelling temperature is typically lower than 0.1 Pa·s; below the gelling temperature, the elastic modulus G' of the gel is typically in the range 0.1-15 kPa when measured during the first 24 hours after gel formation, using the measurement methods based on shear rheometry (such methods, along with the definitions relevant for the gelling temperature, are described, for example, in Parker, A. and Normand, V., Soft Matter, 6, pp 4916-4919 (2010). Preferably, Polyelectrolyte I is a gelatin material.

A second polyelectrolyte (Polyelectrolyte II), which is preferably selected among polysaccharides or another polymer bearing charges of opposite sign compared to Polyelectrolyte I. Generally, Polyelectrolyte II is negatively charged for pH >2. Preferably; such polyelectrolytes are, for example, alginate salts, cellulose derivatives guar gum, pectinate salts, carrageenan, polyacrylic and methacrylic acid or xanthan gum, or yet plant gums such as acacia gum. Most preferably, it is acacia gum (gum arabic).

The ratio between polyelectrolyte 1 and polyelectrolyte 2 is preferably comprised between 10/0.1 to 0.1/10, preferably between 10/1 and 1/10 and more preferably between 6/1 and 1/6.

According to a particular embodiment, the first polyelectrolyte carries a net positive charge when the pH is less than 8 while the second polyelectrolyte carries a net negative charge when the pH is greater than 2.

According to a particular embodiment, the first polyelectrolyte is gelatin and the second polyelectrolyte is selected from the group consisting of gum arabic, xanthan, alginate salts, cellulose derivatives, for example carboxymethyl cellulose, sodium carboxymethyl guar gum, pectinate salts, carrageenan, polyacrylic and methacrylic acid, xanthan gum and plant gums and/or mixtures thereof.

According to a preferred embodiment, the first polyelectrolyte is gelatin and the second is gum Arabic.

According to an embodiment, the coacervate material is present as a gel. According to a particular embodiment, the coacervate first material is a gel formed by providing conditions sufficient to induce gelation of either the first, the second, or both polyelectrolytes. Gelation may be induced by lowering the temperature below the gelling temperature of one of the polyelectrolytes, as detailed above and in the references cited in the previous section. For ionically cross-linkable polyelectrolytes such as chitosan, gelation may be induced by adding appropriate counter-ions such as tripolyphosphate.

According to a preferred embodiment, the coacervate first material is hardened chemically using a suitable cross-linker such as glutaraldehyde, glyoxal, formaldehyde, tannic acid or genipin. According to another preferred embodiment, the coacervate first material is hardened enzymatically using an enzyme such as transglutaminase According to another embodiment, the coacervate is not cross-linked.

According to an embodiment, the second polymeric material is selected from the group consisting of polyurea, polyurethane, polyamide, polyester, polyacrylate, polysiloxane, polycarbonate, polysulfonamide, polymers of urea and formaldehyde, melamine and formaldehyde, melamine and urea, or melamine and glyoxal and mixtures thereof.

According to a particular embodiment, the second material is polyurea and/or polyurethane.

According to an embodiment, the second material is present in an amount less than 3%, preferably less than 1% by weight based on the total weight of the microcapsule slurry. Indeed, it has been underlined that even with a reduced amount of the second material forming the wall, microcapsules still show good stability in consumer products.

In a second particular embodiment of the core-shell microcapsules, the core-shell microcapsule comprises
an oil-based core comprising the perfume formulation
optionally an inner shell made of a polymerized polyfunctional monomer;
a biopolymer shell comprising a protein, wherein at least one protein is cross-linked.

According to an embodiment, the protein is chosen in the group consisting of milk proteins, caseinate salts such as sodium caseinate or calcium caseinate, casein, whey protein, hydrolyzed proteins, gelatins, gluten, pea protein, soy protein, silk protein and mixtures thereof. According to an embodiment, the protein comprises sodium caseinate, preferably cross-linked sodium caseinate.

According to an embodiment, the protein comprises sodium caseinate and a globular protein, preferably chosen in the group consisting of whey protein, beta-lactoglobulin, ovalbumine, bovine serum albumin, vegetable proteins, and mixtures thereof.

The protein is preferably a mixture of sodium caseinate and whey protein.

According to an embodiment, the biopolymer shell comprises a crosslinked protein chosen in the group consisting of sodium caseinate and/or whey protein.

According to a particular embodiment, the microcapsules slurry comprises at least one microcapsule made of:
an oil-based core comprising the perfume formulation
an inner shell made of a polymerized polyfunctional monomer; preferably a polyisocyanate having at least two isocyanate functional groups
a biopolymer shell comprising a protein, wherein at least one protein is cross-linked; wherein the protein contains preferably a mixture comprising sodium caseinate and a globular protein, preferably whey protein.
optionally at least an outer mineral layer.

According to an embodiment, sodium caseinate and/or whey protein is (are) cross-linked protein(s).

The weight ratio between sodium caseinate and whey protein is preferably comprised between 0.01 and 100, preferably between 0.1 and 10, more preferably between 0.2 and 5.

In another particular embodiment, a core-shell as defined above, based on an inner shell of a polymeric material and a biopolymer shell comprising a protein is excluded from the present invention.

In a third particular embodiment of the core-shell microcapsules, the core-shell microcapsule is a polyamide core-shell polyamide microcapsule comprising:
an oil based core comprising the perfume formulation, and
a polyamide shell comprising:
an acyl chloride,
a first amino compound, and
a second amino compound.

According to a particular embodiment, the polyamide core-shell microcapsule comprises:
an oil based core comprising the perfume formulation, and
a polyamide shell comprising:
an acyl chloride, preferably in an amount comprised between 5 and 98%, preferably between 20 and 98%, more preferably between 30 and 85% w/w
a first amino compound, preferably in an amount comprised between 1% and 50% w/w, preferably between 7 and 40% w/w;

a second amino compound, preferably in an amount comprised between 1% and 50% w/w, preferably between 2 and 25% w/w a stabilizer, preferably a biopolymer, preferably in an amount comprised between 0 and 90%, preferably between 0.1 and 75%, more preferably between 1 and 70%.

According to a particular embodiment, the polyamide core-shell microcapsule comprises:

an oil based core comprising the perfume formulation, and a polyamide shell comprising:
an acyl chloride,
a first amino-compound being an amino-acid, preferably chosen in the group consisting of L-Lysine, L-Arginine, L-Histidine, L-Tryptophane and/or mixture thereof.
a second amino. compound chosen in the group consisting of ethylene diamine, diethylene triamine, cystamine and/or mixture thereof, and
a biopolymer chosen in the group consisting of casein, sodium caseinate, bovin serum albumin, whey protein, and/or mixture thereof.

The first amino-compound is different from the second amino-compound.

In another particular embodiment, a polyamide core-shell as defined above, is excluded from the present invention.

According to a particular embodiment of the invention, microcapsules may comprise an outer coating material selected from the group consisting of a polysaccharide, a cationic polymer and mixtures thereof to form an outer coating to the microcapsule.

Polysaccharide polymers are well known to a person skilled in the art. Preferred non-ionic polysaccharides are selected from the group consisting of locust bean gum, xyloglucan, guar gum, hydroxypropyl guar, hydroxypropyl cellulose and hydroxypropyl methyl cellulose, pectin and mixtures thereof.

According to a particular embodiment, the coating consists of a cationic coating.

Cationic polymers are also well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 3.5M Dalton, more preferably between 50,000 and 2M Dalton.

According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

According to any one of the above embodiments of the invention, there is added an amount of polymer described above comprised between about 0% and 5% w/w, or even between about 0.1% and 2% w/w, percentage being expressed on a w/w basis relative to the total weight of microcapsule. It is clearly understood by a person skilled in the art that only part of said added polymers will be incorporated into/deposited on the microcapsule shell.

In a particular embodiment, the carrier (shell material or matrix material) is a biodegradable carrier.

In a particular embodiment, the biodegradable carrier has a biodegradability of at least 60%, preferably at least 65%, 70%, 75%, 80%, 85%, 90%, 95% or 98%, within 60 days according to OECD301F.

OECD301F is a standard test method on the biodegradability from the Organisation of Economic Co-operation and Development.

By "perfuming formulation" it is herein understood a formulation which is for fine and functional perfumery. In particular, perfuming ingredients, solvents or adjuvants of current use can be combined for the preparation of a perfume formulation.

According to the present invention, the perfume formulation comprises 0 to 60 wt. % of a hydrophobic solvent.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, triacetin, or isoparaffins, preferably Abalyn®, benzyl benzoate, limonene or other terpenes, or isoparaffins.

Most preferably, the solvent is very hydrophobic and highly sterically hindered, like for example Abalyn® or benzyl benzoate. According to an embodiment, the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

According to a particular embodiment, the hydrophobic solvent is a density balancing material preferably chosen in the group consisting of benzyl salicylate, benzyl benzoate, cyclohexyl salicylate, benzyl phenylacetate, phenylethyl phenylacetate, triacetin, ethyl citrate, methyl and ethyl salicylate, benzyl cinnamate, and mixtures thereof.

A "density balancing material" should be understood as a material having a density preferably greater than 1.07 g/cm$^3$ and having preferably low or no odor.

The density of a component is defined as the ratio between its mass and its volume (g/cm$^3$).

Several methods are available to determine the density of a component.

One may refer for example to the ISO 298:1998 method to measure d20 densities of essential oils.

By "perfume oil" (or also "perfume") or "flavour" is herein understood an ingredient or composition that is a liquid at about 20° C. Said perfume or flavour oil can be a perfuming or flavouring ingredient alone or a mixture of ingredients in the form of a perfuming or flavouring composition. As a "perfuming ingredient" it is meant here a compound, which is used in perfuming preparations or compositions to impart as primary purpose a hedonic effect. In other words such an ingredient, to be considered as being a perfuming one, must be recognized by a person skilled in the art as being able to at least impart or modify in a positive or pleasant way the odor of a composition, and not just as having an odor. The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

In particular one may cite perfuming ingredients which are commonly used in perfume formulations, such as:

Aldehydic ingredients: decanal, dodecanal, 2-methyl-undecanal, 10-undecenal, octanal, nonanal and/or nonenal;

Aromatic-herbal ingredients: eucalyptus oil, camphor, eucalyptol, 5-methyltricyclo[6.2.1.0~2,7~]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one and/or menthol;

Balsamic ingredients: coumarin, ethylvanillin and/or vanillin;

Citrus ingredients: dihydromyrcenol, citral, orange oil, linalyl acetate, citronellyl nitrile, orange terpenes, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, tetrahydro-2-isobutyl-4-methyl-4(2H)-pyranol, beta ionone, methyl 2-(methylamino)benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S)-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)-[1-(3',3'-dimethyl-1'-cyclohexyl)ethoxycarbonyl]methyl propanoate ;

Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2,7}$]undec[4]ene, (1-ethoxyethoxy)cyclododecane, 2,2,9,11-tetramethylspiro[5.5]undec-8-en-1-yl acetate, 1-(octahydro-2,3,8,8-tetramethyl-2-naphtalenyl)-1-ethanone, patchouli oil, terpenes fractions of patchouli oil, Clearwood®, (1'R, E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6, 7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

According to an embodiment, the perfuming formulation comprises a fragrance modulator (that can be used in addition to the hydrophobic solvent when present or as substitution of the hydrophobic solvent when there is no hydrophobic solvent).

Preferably, the fragrance modulator is defined as a fragrance material with
i. a vapor pressure of less than 0.0008 Torr at 22° C.;
ii. a c log P of 3.5 and higher, preferable 4.0 and higher and more preferable 4.5
iii. at least two Hansen solubility parameters selected from a first group consisting of: an atomic dispersion force from 12 to 20, a dipole moment from 1 to 7, and a hydrogen bonding from 2.5 to 11,
iv. at least two Hansen solubility parameters selected from a second group consisting of: an atomic dispersion force from 14 to 20, a dipole moment from 1 to 8, and a hydrogen bonding from 4 to 11, when in solution with a compound having a vapor pressure range of 0.0008 to 0.08 Torr at 22° C.

Preferable as examples the following ingredients can be listed as modulators but the list in not limited to the following materials: alcohol C12, oxacyclohexadec-12/13-en-2-one, 3-[(2',2',3'-trimethyl-3'-cyclopenten-1'-yl)methoxy]-2-butanol, cyclohexadecanone, (Z)-4-cyclopentadecen-1-one, cyclopentadecanone, (8Z)-oxacycloheptadec-8-en-2-one, 2-[5-(tetrahydro-5-methyl-5-vinyl-2-furyl)-tetrahydro-5-methyl-2-furyl]-2-propanol, muguet aldehyde, 1,5,8-trimethyl-13-oxabicyclo[10.1.0]trideca-4,8-diene, (++4,6,6,7,8,8-hexamethyl-1,3,4,6,7,8-hexahydrocyclopenta[g]isochromene, (+)-(1S,2S,3S,5R)-2,6,6-trimethyl-spiro[bicyclo[3.1.1]heptane-3,1'-cyclohexane]-2'-en-4'-one, oxacyclohexadecan-2-one, 2-{(1S)-1-[(1R)-3,3-dimethylcyclohexyl]ethoxy}-2-oxoethyl propionate, (+)-(4R,4aS,6R)-4,4a-dimethyl-6-(1-propen-2-yl)-4,4a,5,6,7,8-hexahydro-2(3H)-naphthalenone, amylcinnamic aldehyde, hexylcinnamic aldehyde, hexyl salicylate, (1E)-1-(2,6,6-trimethyl-1-cyclohexen-1-yl)-1,6-heptadien-3-one, (9Z)-9-cycloheptadecen-1-one.

A perfumery base according to the invention may not be limited to the above mentioned perfuming ingredients, and many other of these ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds also known as properfume or profragrance. Non-limiting examples of suitable properfume may include 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 2-phenylethyl oxo(phenyl)acetate or a mixture thereof.

According to an embodiment, the perfume oil comprises at least 35% of perfuming ingredients having a log P above 3.

Log P is the common logarithm of estimated octanol-water partition coefficient, which is known as a measure of lipophilicity.

The Log P values of many perfuming compound have been reported, for example, in the Pomona92 database, available from Daylight Chemical Information Systems, Inc. (Daylight CIS), Irvine, Calif., which also contains citations to the original literature. Log P values are most conveniently calculated by the "C LOG P" program, also available from Daylight CIS. This program also lists experimental log P values when they are available in the Pomona92 database. The "calculated log P" (c Log P) is determined by the fragment approach of Hansch and Leo (cf., A. Leo, in Comprehensive Medicinal Chemistry, Vol. 4, C. Hansch, P. G. Sammens, J. B. Taylor and C. A. Ramsden, Eds., p. 295, Pergamon Press, 1990). The fragment approach is based on the chemical structure of each perfume oil ingredient, and takes into account the numbers and types of atoms, the atom connectivity, and chemical bonding. The c Log P values, which are the most reliable and widely used estimates for this physicochemical property, are preferably used instead of the experimental Log P values in the selection of perfuming compounds which are useful in the present invention.

In a particular embodiment, the perfume oil comprises at least 40%, preferably at least 50%, more preferably at least 60% of ingredients having a log P above 3, preferably above 3.5 and even more preferably above 3.75.

Preferably, the perfume oil contains less than 10% of its own weight of primary alcohols, less than 15% of its own weight of secondary alcohols and less than 20% of its own weight of tertiary alcohols. Advantageously, the perfume used in the invention does not contain any primary alcohols and contains less than 15% of secondary and tertiary alcohols.

According to an embodiment, the perfume oil comprises at least 20%, preferably at least 25%, more preferably at least 40% of Bulky materials of groups 1 to 6, preferably 3 to 6 The term Bulky materials is herein understood as perfuming ingredients having a high steric hindrance, i.e. having a substitution pattern which provides high steric hinderance and thus The Bulky materials are in particular those from one of the following groups:
Group 1: perfuming ingredients comprising a cyclohexane, cyclohexene, cyclohexanone or cyclohexenone ring substituted with at least one 1 to 4 nodes comprising substituent, preferably at least one linear or branched $C_1$ to $C_4$ alkyl or alkenyl substituent;
Group 2: perfuming ingredients comprising a cyclopentane, cyclopentene, cyclopentanone or cyclopentenone ring substituted with at least one 4 or more nodes comprising substituent, preferably at least one linear or branched $C_4$ or longer, preferably $C_4$ to $C_8$ alkyl or alkenyl substituent;
Group 3: perfuming ingredients comprising a phenyl ring or perfuming ingredients comprising a cyclohexane, cyclohexene, cyclohexanone or cyclohexenone ring substituted with at least one 5 or more nodes comprising substituent, preferably at least one linear or branched $C_5$ or longer, preferably $C_5$ to $C_8$, alkyl or alkenyl substituent, or with at least one phenyl substituent and optionally one or more 1 to 3 nodes comprising substituents, preferably one or more linear or branched $C_1$ to $C_3$ alkyl or alkenyl substituents;
Group 4: perfuming ingredients comprising at least two fused or linked 5 membered or 6 membered rings, preferably at least two fused or linked $C_5$ and/or $C_6$ rings;
Group 5: perfuming ingredients comprising a camphor-like ring structure, i.e. two 5 or 6 membered rings that are fused in a bridge-type fashion;
Group 6: perfuming ingredients comprising at least one 7 to 20 membered ring, preferably at least one C7 or C20 ring structure.

The term nodes as understood in this context means any atom which is able to provide at least two, preferably at least 3, more preferably 4, bonds to further atoms. Particular examples of nodes as herein understood are carbon atoms (up to 4 bonds to further atoms), nitrogen atoms (up to 3 bonds to further atoms), oxygen atoms (up to 2 bonds to further atoms) and sulfur (up to 2 bonds to further atoms). Particular examples of further atoms as understood in this context could be carbon atoms, nitrogen atoms, sulfur atoms, oxygen atoms and hydrogen atoms.

Examples of ingredients from each of these groups are:

Group 1: 2,4-dimethyl-3-cyclohexene-1-carbaldehyde (origin: Firmenich SA, Geneva, Switzerland), isocyclocitral, menthone, isomenthone, Romascone® (methyl 2,2-dimethyl-6-methylene-1-cyclohexanecarboxylate, origin: Firmenich SA, Geneva, Switzerland), nerone, terpineol, dihydroterpineol, hexylate, rose oxide, Perycorolle® ((S)-1,8-p-menthadiene-7-ol, origin: Firmenich SA, Geneva, Switzerland), 1-p-menthene-4-ol, (1RS,3RS,4SR)-3-p-mentanyl acetate, cyclohexyl acetate, 2,4,6-trimethyl-3-cyclohexene-1-carbaldehyde, para tert-butylcyclohexanone, menthenethiol, 2-tert-butyl-1-cyclohexyl acetate (origin: International Flavors and Fragrances, USA), Lorysia® (4-(1,1-dimethylethyl)-1-cyclohexyl acetate, origin: Firmenich SA, Geneva, Switzerland);

Group 2: (E)-3-methyl-5-(2,2,3-trimethyl-3-cyclopenten-1-yl)-4-penten-2-ol (origin: Givaudan SA, Vernier, Switzerland), (1'R,E)-2-ethyl-4-(2',2',3'-trimethyl-3'-cyclopenten-1-yl)-2-buten-1-ol (origin: Firmenich SA, Geneva, Switzerland), Polysantol® ((1'R,E)-3,3-dimethyl-5-(2',2',3'-trimethyl-3'-cyclopenten-1'-yl)-4-penten-2-ol, origin: Firmenich SA, Geneva, Switzerland), fleuramone, Hedione® HC (methyl-cis-3-oxo-2-pentyl-1-cyclopentane acetate, origin: Firmenich SA, Geneva, Switzerland), Veloutone® (2,2,5-Trimethyl-5-pentyl-1-cyclopentanone, origin: Firmenich SA, Geneva, Switzerland), Nirvanol® (3,3-dimethyl-5-(2, 2,3-trimethyl-3-cyclopenten-1-yl)-4-penten-2-ol, origin: Firmenich SA, Geneva, Switzerland), 3-methyl-5-(2,2,3-trimethyl-3-cyclopenten-1-yl)-2-pentanol (origin, Givaudan SA, Vernier, Switzerland), dartanol, fructone;

Group 3: Neobutenone® (1-(5,5-dimethyl-1-cyclohexen-1-yl)-4-penten-1-one, origin: Firmenich SA, Geneva, Switzerland), nectalactone ((1'R)-2-[2-(4'-methyl-3'-cyclohexen-1'-yl)propyl]cyclopentanone), Dynascone® (mixture of 1-(5,5-dimethyl-1-cyclohexen-1-yl)-4-penten-1-one and 1-(3,3-dimethyl-1-cyclohexen-1-yl)-4-penten-1-one, origin: Firmenich SA, Geneva, Switzerland), Romandolide® ((1S,1'R)-[1-(3',3'-Dimethyl-1'-cyclohexyl)ethoxycarbonyl]methyl propanoate, origin: Firmenich SA, Geneva, Switzerland), Limbanol® (1-(2,2,3,6-tetramethyl-cyclohexyl)-3-hexanol, origin: Firmenich SA, Geneva, Switzerland), trans-1-(2,2,6-trimethyl-1-cyclohexyl)-3-hexanol (origin: Firmenich SA, Geneva, Switzerland), (E)-3-methyl-4-(2, 6,6-trimethyl-2-cyclohexen-1-yl)-3-buten-2-one, terpenyl isobutyrate, 8-methoxy-1-p-menthene, Helvetolide® ((1S,11=1)-2-[1-(3,3-dimethyl-1'-cyclohexyl) ethoxy]-2-methylpropyl propanoate, origin: Firmenich SA, Geneva, Switzerland), 1-methyl-4-(4-methyl-3-pentenyl)-3-cyclohexene-1-carbaldehyde, allyl cyclohexylpropionate, 2-methoxy-4-methylphenyl methyl carbonate, ethyl 2-methoxy-4-methylphenyl carbonate, 4-ethyl-2-methoxyphenyl methyl carbonate, Doremox® (tetrahydro-4-methyl-2-phenyl-2H-pyran, origin: Firmenich SA, Geneva, Switzerland), 2,4,6-trimethyl-4-phenyl-1,3-dioxane, terpenyl acetate, dihydroterpenyl acetate, cyclanol acetate, Fructalate® (1,4-cyclohexane diethyldicarboxylate, origin: Firmenich SA, Geneva, Switzerland), alpha-ionone, beta-ionone, damascenone, damascones, Floralozone, Peonile, amylcinnamic aldehdye, hexylcinnamic aldehyde, benzyl cinnamate, amyl salicylate, hexyl salicylate, MPGE (=ethyl 2,3-epoxy-3-phenylbutanoate) Dorysane;

Group 4: vetyverone, 1-(octahydro-2,3,8,8-tetramethyl-2-naphtalenyl)-1-ethanone (origin: International Flavors and Fragrances, USA), (5RS,9RS,10SR)-2,6,9,10-tetramethyl-1-oxaspiro[4.5]deca-3,6-diene and the (5RS, 9SR,10RS) isomer, 6-ethyl-2,10,10-trimethyl-1-oxaspiro[4.5]deca-3,6-diene, 1,2,3,5,6,7-hexahydro-1,1,2, 3,3-pentamethyl-4-indenone (origin: International Flavors and Fragrances, USA), Hivernal® (a mixture of 3-(3,3-dimethyl-5-indanyl)propanal and 3-(1,1-dimethyl-5-indanyl)propanal, origin: Firmenich SA, Geneva, Switzerland), Polywood® (perhydro-5,5,8A-trimethyl-2-naphthalenyl acetate, origin: Firmenich SA, Geneva, Switzerland), octalynol, Cetalox® (dodecahydro-3a,6,6,9a-tetramethyl-naphtho[2,1-b]furan, origin: Firmenich SA, Geneva, Switzerland), Koumalactone® ((3ARS,6SR,7ASR)-perhydro-3,6-dimethylbenzo[B]furan-2-one, origin: Firmenich SA, Geneva, Switzerland), Natactone® ((6R)-perhydro-3,6-dimethyl-benzo[B]furan-2-one, origin: Firmenich SA, Geneva, Switzerland), yara yara, bromelia, heliopropanal, octahydrocoumarine, galaxolide;

Group 5: camphor, borneol, isobornyl acetate, 8-isopropyl-6-methyl-bicyclo[2.2.2]oct-5-ene-2-carbaldehyde, Florex® (mixture of 9-ethylidene-3-oxatricyclo[6.2.1.0 (2,7)]undecan-4-one and 10-ethylidene-3-oxatricyclo [6.2.1.0(2,7)]undecan-4-one, origin: Firmenich SA, Geneva, Switzerland), (1R,2S,4R)-4,6,6-trimethyl-bicyclo[3,1,1]heptan-2-ol, nopyl acetate, patchoulol, tricyclo[5.2.1.0(2,6)]dec-3-en-8-yl acetate and tricyclo [5.2.1.0(2,6)]dec-4-en-8-yl acetate as well as tricyclo [5.2.1.0(2,6)]dec-3-en-8-yl propanoate and tricyclo [5.2.1.0(2,6)]dec-4-en-8-yl propanoate, eucalyptol, Rhubofix® (3',4-dimethyl-tricyclo[6.2.1.0(2,7)]undec-4-ene-9-spiro-2'-oxirane, origin: Firmenich SA, Geneva, Switzerland), 9/10-ethyldiene-3-oxatricyclo [6.2.1.0(2,7)]undecane, Verdylate, (+)-(1S,2S,3S)-2,6, 6-trimethyl-bicyclo[3.1.1]heptane-3-spiro-2'-cyclohexen-4'-one Group 6: Cedroxyde® (trimethyl-13-oxabicyclo-[10.1.0]-trideca-4,8-diene, origin: Firmenich SA, Geneva, Switzerland), Ambrettolide LG ((E)-9-hexadecen-16-olide, origin: Firmenich SA, Geneva, Switzerland), Habanolide® (pentadecenolide, origin: Firmenich SA, Geneva, Switzerland), muscenone (3-methyl-(4/5)-cyclopentadecenone, origin: Firmenich SA, Geneva, Switzerland), muscone (origin: Firmenich SA, Geneva, Switzerland), Exaltolide® (pentadecanolide, origin: Firmenich SA, Geneva, Switzerland), Exaltone® (cyclopentadecanone, origin: Firmenich SA, Geneva, Switzerland), (1-ethoxyethoxy)cyclododecane (origin: Firmenich SA, Geneva, Switzerland), Astrotone, 4,8-cyclododecadien-1-one, Methyl cedryl ketone (origin: International Flavors and Fragrances, USA), vetyverol, cedramber (8-methoxy-2,6,6,8-tetramethyl-tricyclo [5.3.1.0(1,5)]undecane, origin: Firmenich SA, Geneva, Switzerland), cedrene, cedrenol, cedrol, 3-methoxy-7, 7-dimethyl-10-methylene-bicyclo[4.3.1]decane (origin: Firmenich SA, Geneva, Switzerland).

Preferably, the perfume oil comprises at least 25%, preferably at least 30%, preferably at least 40%, preferably at least 50%, more preferably at least 60% of ingredients selected from Groups 1 to 6, as defined above. More preferably said perfume comprises at least 30%, preferably at least 40%, preferably at least 50% of ingredients from Groups 3 to 6, as defined above. Most preferably said perfume comprises at least 30%, preferably at least 50% of ingredients from Groups 3, 4 or 6, as defined above.

According to an embodiment, the perfume oil comprises at least 15% of high impact perfume materials having a Log T<−4.

"High impact perfume raw materials" should be understood as perfume raw materials having a Log T<−4. The odor threshold concentration of a chemical compound is determined in part by its shape, polarity, partial charges and molecular mass. For convenience, the threshold concentration is presented as the common logarithm of the threshold concentration, i.e., Log [Threshold] ("Log T").

The odor threshold concentration of a perfuming compound is determined by using a gas chromatograph ("GC"). Specifically, the gas chromatograph is calibrated to determine the exact volume of the perfume oil ingredient injected by the syringe, the precise split ratio, and the hydrocarbon response using a hydrocarbon standard of known concentration and chain-length distribution. The air flow rate is accurately measured and, assuming the duration of a human inhalation to last 12 seconds, the sampled volume is calculated. Since the precise concentration at the detector at any point in time is known, the mass per volume inhaled is known and hence the concentration of the perfuming compound. To determine the threshold concentration, solutions are delivered to the sniff port at the back-calculated concentration. A panelist sniffs the GC effluent and identifies the retention time when odor is noticed. The average across all panelists determines the odor threshold concentration of the perfuming compound. The determination of odor threshold is described in more detail in C. Vuilleumier et al., Multi-dimensional Visualization of Physical and Perceptual Data Leading to a Creative Approach in Fragrance Development, Perfume & Flavorist, Vol. 33, September, 2008, pages 54-61.

According to a particular embodiment, the high impact perfume raw materials having a Log T<−4 are selected from the list in Table A below.

TABLE A high impact perfume raw materials having a Log T < −4

Perfume raw materials (Log T < −4)

(+−)-1-METHOXY-3-HEXANETHIOL
4-(4-HYDROXY-1-PHENYL)-2-BUTANONE
(+−)-2-(4-METHYL-3-CYCLOHEXEN-1-YL)-2-PROPANETHIOL
2-METHOXY-4-(1-PROPENYL)-1-PHENYL ACETATE
PYRAZOBUTYLE
3-PROPYLPHENOL
1-(3-METHYL-1-BENZOFURAN-2-YL)ETHANONE
2-(3-PHENYLPROPYL)PYRIDINE
1-(3,3-DIMETHYL-1-CYCLOHEXEN-1-YL)-4-PENTEN-1-ONE (A) + 1-(5,5-DIMETHYL-
1-CYCLOHEXEN-1-YL)-4-PENTEN-1-ONE (B)
1-(5,5-DIMETHYL-1-CYCLOHEXEN-1-YL)-4-PENTEN-1-ONE
(3RS,3ARS,6SR,7ASR)-PERHYDRO-3,6-DIMETHYL-BENZO[B]FURAN-2-ONE (A) +
(3SR,3ARS,6SR,7ASR)-PERHYDRO-3,6-DIMETHYL-BENZO[B]FURAN-2-ONE (B)
(+−)-1-(5-ETHYL-5-METHYL-1-CYCLOHEXEN-1-YL)-4-PENTEN-1-ONE
(1'S,3'R)-1-METHYL-2-[(1',2',2'-TRIMETHYLBICYCLO[3.1.0]HEX-3'-
YL)METHYL]CYCLOPROPYL}METHANOL
(+−)-3-MERCAPTOHEXYL ACETATE
(2E)-1-(2,6,6-TRIMETHYL-1,3-CYCLOHEXADIEN-1-YL)-2-BUTEN-1-ONE
7-METHYL-2H-1,5-BENZODIOXEPIN-3(4H)-ONE
(2E,6Z)-2,6-NONADIEN-1-OL
(4Z)-4-DODECENAL
(+−)-4-HYDROXY-2,5-DIMETHYL-3(2H)-FURANONE
METHYL 2,4-DIHYDROXY-3,6-DIMETHYLBENZOATE
3-METHYLINDOLE
(+−)-PERHYDRO-4ALPHA,8ABETA-DIMETHYL-4A-NAPHTHALENOL PATCHOULOL
2-METHOXY-4-(1-PROPENYL)PHENOL
(+−)-5,6-DIHYDRO-4-METHYL-2-PHENYL-2H-PYRAN (A) + TETRAHYDRO-4-
METHYLENE-2-PHENYL-2H-PYRAN (B) 4-METHYLENE-2-PHENYLTETRAHYDRO-
2H-PYRAN (A) + (+−)-4-METHYL-2-PHENYL-3,6-DIHYDRO-2H-PYRAN (B)
4-HYDROXY-3-METHOXYBENZALDEHYDE
NONYLENIC ALDEHYDE
2-METHOXY-4-PROPYLPHENOL
(2Z)-3-METHYL-5-PHENYL-2-PENTENENITRILE (A) + (2E)-3-METHYL-5-PHENYL-2-
PENTENENITRILE (B)
1-(SPIRO[4.5]DEC-6-EN-7-YL)-4-PENTEN-1-ONE (A) + 1-(SPIRO[4.5]DEC-7-EN-7-YL)-4-
PENTEN-1-ONE (B)
2-METHOXYNAPHTHALENE
(−)-(3AR,5AS,9AS,9BR)-3A,6,6,9A-TETRAMETHYLDODECAHYDRONAPHTHO[2,1-
B]FURAN
5-NONANOLIDE
(3AR,5AS,9AS,9BR)-3A,6,6,9A-TETRAMETHYLDODECAHYDRONAPHTHO[2,1-
B]FURAN
7-ISOPROPYL-2H,4H-1,5-BENZODIOXEPIN-3-ONE
COUMARIN

TABLE A-continued high impact perfume raw materials having a Log T < −4

Perfume raw materials (Log T < −4)

4-METHYLPHENYL ISOBUTYRATE
(2E)-1-(2,6,6-TRIMETHYL-1,3-CYCLOHEXADIEN-1-YL)-2-BUTEN-1-ONE
BETA,2,2,3-TETRAMETHYL-DELTA-METHYLENE-3-CYCLOPENTENE-1-BUTANOL
DELTA DAMASCONE ((2E)-1-[(1RS,2SR)-2,6,6-TRIMETHYL-3-CYCLOHEXEN-1-YL]-
2-BUTEN-1-ONE)
(+−)-3,6-DIHYDRO-4,6-DIMETHYL-2-PHENYL-2H-PYRAN
ANISALDEHYDE
PARACRESOL
3-ETHOXY-4-HYDROXYBENZALDEHYDE
METHYL 2-AMINOBENZOATE
ETHYL METHYLPHENYLGLYCIDATE
OCTALACTONE G
ETHYL 3-PHENYL-2-PROPENOATE
(−)-(2E)-2-ETHYL-4-[(1R)-2,2,3-TRIMETHYL-3-CYCLOPENTEN-1-YL]-2-BUTEN-1-OL
PARACRESYL ACETATE
DODECALACTONE
TRICYCLONE
(+)-(3R,5Z)-3-METHYL-5-CYCLOPENTADECEN-1-ONE
UNDECALACTONE
(1R,4R)-8-MERCAPTO-3-P-MENTHANONE
(3S,3AS,6R,7AR)-3,6-DIMETHYLHEXAHYDRO-1-BENZOFURAN-2(3H)-ONE
BÉTA IONONE
(+−)-6-PENTYLTETRAHYDRO-2H-PYRAN-2-ONE
(3E,5Z)-1,3,5-UNDECATRIENE
10-UNDECENAL (A) + (9E)-9-UNDECENAL (B) + (9Z)-9-UNDECENAL (C)
(Z)-4-DECENAL
(+−)-ETHYL 2-METHYLPENTANOATE
1,2-DIALLYLDISULFANE
(2Z)-2-TRIDECENENITRILE (A) + (3Z)-3-TRIDECENENITRILE (B) + (3E)-3-
TRIDECENENITRILE (C) + (2E)-2-TRIDECENENITRILE (D)
(+−)-2-ETHYL-4,4-DIMETHYL-1,3-OXATHIANE
(+)-(3R,5Z)-3-METHYL-5-CYCLOPENTADECEN-1-ONE
3-(4-TERT-BUTYLPHENYL)PROPANAL
ALLYL (CYCLOHEXYLOXY)ACETATE
METHYLNAPHTHYLKETONE
(+−)-(4E)-3-METHYL-4-CYCLOPENTADECEN-1-ONE (A) + (+−)-(5E)-3-METHYL-5-
CYCLOPENTADECEN-1-ONE (B) + (+−)-(5Z)-3-METHYL-5-CYCLOPENTADECEN-1-
ONE (C)
CYCLOPROPYLMETHYL (3Z)-3-HEXENOATE (A) + CYCLOPROPYLMETHYL (3E)-
3-HEXENOATE (B)
(4E)-4-METHYL-5-(4-METHYLPHENYL)-4-PENTENAL
(+−)-1-(5-PROPYL-1,3-BENZODIOXOL-2-YL)ETHANONE
4-METHYL-2-PENTYLPYRIDINE
(+−)-(E)-3-METHYL-4-(2,6,6-TRIMETHYL-2-CYCLOHEXEN-1-YL)-3-BUTEN-2-ONE
(3ARS,5ASR,9ASR,9BRS)-3A,6,6,9A-
TETRAMETHYLDODECAHYDRONAPHTHO[2,1-B]FURAN
(2S,5R)-5-METHYL-2-(2-PROPANYL)CYCLOHEXANONE OXIME
6-HEXYLTETRAHYDRO-2H-PYRAN-2-ONE
(+−)-3-(3-ISOPROPYL-1-PHENYL)BUTANAL
METHYL 2-((1RS,2RS)-3-OXO-2-PENTYLCYCLOPENTYL)ACETATE (A) + METHYL2-
((1RS,2SR)-3-OXO-2-PENTYLCYCLOPENTYL)ACETATE (B)
1-(2,6,6-TRIMETHYL-1-CYCLOHEX-2-ENYL)PENT-1-EN-3-ONE
INDOL
7-PROPYL-2H,4H-1,5-BENZODIOXEPIN-3-ONE
ETHYL PRALINE
(4-METHYLPHENOXY)ACETALDEHYDE
ETHYL TRICYCLO[5.2.1.0.(2,6)]DECANE-2-CARBOXYLATE
(+)-(1'S,2S,E)-3,3-DIMETHYL-5-(2',2',3'-TRIMETHYL-3'-CYCLOPENTEN-1'-YL)-4-
PENTEN-2-OL
(2R,4E)-3,3-DIMETHYL-5-[(1R)-2,2,3-TRIMETHYL-3-CYCLOPENTEN-1-YL]-4-
PENTEN-2-OL (A) + (2S,4E)-3,3-DIMETHYL-5-[(1R)-2,2,3-TRIMETHYL-3-
CYCLOPENTEN-1-YL]-4-PENTEN-2-OL (B)
8-ISOPROPYL-6-METHYL-BICYCLO[2.2.2]OCT-5-ENE-2-CARBALDEHYDE
METHYLNONYLACETALDEHYDE
4-FORMYL-2-METHOXYPHENYL 2-METHYLPROPANOATE
(E)-4-DECENAL
(+−)-2-ETHYL-4-(2,2,3-TRIMETHYL-3-CYCLOPENTEN-1-YL)-2-BUTEN-1-OL
(1R,5R)-4,7,7-TRIMETHYL-6-THIABICYCLO[3.2.1]OCT-3-ENE (A) + (1R,4R,5R)-4,7,7-
TRIMETHYL-6-THIABICYCLO[3.2.1]OCTANE (B)
(−)-(3R)-3,7-DIMETHYL-1,6-OCTADIEN-3-OL
(E)-3-PHENYL-2-PROPENENITRILE
4-METHOXYBENZYL ACETATE

TABLE A-continued high impact perfume raw materials having a Log T < −4

Perfume raw materials (Log T < −4)

(E)-3-METHYL-5-(2,2,3-TRIMETHYL-3-CYCLOPENTEN-1-YL)-4-PENTEN-2-OL
ALLYL (3-METHYLBUTOXY)ACETATE (A) + (+−)-ALLYL (2-METHYLBUTOXY)ACETATE
(+−)-(2E)-1-(2,6,6-TRIMETHYL-2-CYCLOHEXEN-1-YL)-2-BUTEN-1-ONE
(1E)-1-(2,6,6-TRIMETHYL-1-CYCLOHEXEN-1-YL)-1-PENTEN-3-ONE

According to an embodiment, perfume raw materials having a Log T<−4 are chosen in the group consisting of aldehydes, ketones, alcohols, phenols, esters lactones, ethers, epoxydes, nitriles and mixtures thereof.

According to an embodiment, perfume raw materials having a Log T<−4 comprise at least one compound chosen in the group consisting of alcohols, phenols, esters lactones, ethers, epoxydes, nitriles and mixtures thereof, preferably in amount comprised between 20 and 70% by weight based on the total weight of the perfume raw materials having a Log T<−4.

According to an embodiment, perfume raw materials having a Log T<−4 comprise between 20 and 70% by weight of aldehydes, ketones, and mixtures thereof based on the total weight of the perfume raw materials having a Log T<−4.

The remaining perfume raw materials contained in the oil-based core may have therefore a Log T>−4.

Non limiting examples of perfume raw materials having a Log T>−4 are listed in table B below.

TABLE B perfume raw materials having a Log T > −4

Perfume raw materials (Log T > −4)
ETHYL 2-METHYLBUTYRATE
(E)-3-PHENYL-2-PROPENYL ACETATE
(+−)-8-SEC-BUTYLQUINOLINE (A) + (+−)-6-SEC-BUTYLQUINOLINE
(+−)-3-(1,3-BENZODIOXOL-5-YL)-2-METHYLPROPANAL
VERDYLE PROPIONATE
1-(OCTAHYDRO-2,3,8,8-TETRAMETHYL-2-NAPHTALENYL)-1-ETHANONE
METHYL 2-((1RS,2RS)-3-OXO-2-PENTYLCYCLOPENTYL)ACETATE
(+−)-(E)-4-METHYL-3-DECEN-5-OL
2,4-DIMETHYL-3-CYCLOHEXENE-1-CARBALDEHYDE
1,3,3-TRIMETHYL-2-OXABICYCLO[2.2.2]OCTANE
TETRAHYDRO-4-METHYL-2-(2-METHYL-1-PROPENYL)-2H-PYRAN
ALDEHYDE C 12
1-OXA-12-CYCLOHEXADECEN-2-ONE(A) + 1-OXA-13-CYCLOHEXADECEN-2-ONE (B)
(+−)-3-(4-ISOPROPYLPHENYL)-2-METHYLPROPANAL
ALDEHYDE C 11 LENIQUE
(+−)-2,6-DIMETHYL-7-OCTEN-2-OL
(+−)-2,6-DIMETHYL-7-OCTEN-2-OL
ALLYL 3-CYCLOHEXYLPROPANOATE
(Z)-3-HEXENYL ACETATE
(2RS,5SR)-5-METHYL-2-(2-PROPANYL)CYCLOHEXANONE (A) + (2RS,5RS)-5-METHYL-2-(2-PROPANYL)CYCLOHEXANONE (B)
ALLYL HEPTANOATE
(1RS,2RS)-2-(2-METHYL-2-PROPANYL)CYCLOHEXYL ACETATE (A) + (1RS,2SR)-2-(2-METHYL-2-PROPANYL)CYCLOHEXYL ACETATE (B)
1,1-DIMETHYL-2-PHENYLETHYL BUTYRATE
GERANYL ACETATE (A) + NERYL ACETATE (B)
(+−)-1-PHENYLETHYL ACETATE
1,1-DIMETHYL-2-PHENYLETHYL ACETATE
3-METHYL-2-BUTENYL ACETATE
ETHYL 3-OXOBUTANOATE (A) <=> (2Z)-ETHYL 3-HYDROXY-2-BUTENOATE (B)
8-P-MENTHANOL

TABLE B-continued perfume raw materials having a Log T > −4

8-P-MENTHANYL ACETATE (A) + 1-P-MENTHANYL ACETATE (B)
(+−)-2-(4-METHYL-3-CYCLOHEXEN-1-YL)-2-PROPANYL ACETATE
(+−)-2-METHYLBUTYL BUTANOATE
2-{(1S)-1-[(1R)-3,3-DIMETHYLCYCLOHEXYL]ETHOXY}-2-OXOETHYL PROPIONATE
3,5,6-TRIMETHYL-3-CYCLOHEXENE-1-CARBALDEHYDE (A) + 2,4,6-TRIMETHYL-3-CYCLOHEXENE-1-CARBALDEHYDE (B)
2-CYCLOHEXYLETHYL ACETATE
ALDEHYDE C 8
ETHYL BUTANOATE
(+−)-(3E)-4-(2,6,6-TRIMETHYL-2-CYCLOHEXEN-1-YL)-3-BUTEN-2-ONE (A) + (3E)-4-(2,6,6-TRIMETHYL-1-CYCLOHEXEN-1-YL)-3-BUTEN-2-ONE (B);
1-[(1RS,6SR)-2,2,6-TRIMETHYLCYCLOHEXYL]-3-HEXANOL
1,3,3-TRIMETHYL-2-OXABICYCLO[2.2.2]OCTANE
1,3,3-TRIMETHYL-2-OXABICYCLO[2.2.2]OCTANE
ETHYL HEXANOATE
UNDECANAL
ALDEHYDE C 10
2-PHENYLETHYL ACETATE
(1S,2S,4S)-1,7,7-TRIMETHYLBICYCLO[2.2.1]HEPTAN-2-OL (A) + (1S,2R,4S)-1,7,7-TRIMETHYLBICYCLO[2.2.1]HEPTAN-2-OL (B)
(+−)-3,7-DIMETHYL-3-OCTANOL
1-METHYL-4-(2-PROPANYLIDENE)CYCLOHEXENE
(+)-(R)-4-(2-METHOXYPROPAN-2-YL)-1-METHYLCYCLOHEX-1-ENE VERDYL ACETATE
(3R)-1-[(1R,6S)-2,2,6-TRIMETHYLCYCLOHEXYL]-3-HEXANOL (A) + (3S)-1-[(1R,6S)-2,2,6-TRIMETHYLCYCLOHEXYL]-3-HEXANOL (B) + (3R)-1-[(1S,6S)-2,2,6-TRIMETHYLCYCLOHEXYL]-3-HEXANOL (C)
(+)-(1S,1'R)-2-[1-(3',3'-DIMETHYL-1'-CYCLOHEXYL)ETHOXY]-2-METHYLPROPYL PROPANOATE

The nature of high impact perfume raw materials having a Log T<−4 and density balancing material having a density greater than 1.07 g/cm$^3$ are described in WO2018115250, the content of which are included by reference.

In a particular embodiment, the hydrophobic solvent has Hansen Solubility Parameters compatible with entrapped perfume oil.

The term "Hansen solubility parameter" is understood refers to a solubility parameter approach proposed by Charles Hansen used to predict polymer solubility and was developed around the basis that the total energy of vaporization of a liquid consists of several individual parts. To calculate the "weighted Hansen solubility parameter" one must combine the effects of (atomic) dispersion forces, (molecular) permanent dipole-permanent dipole forces, and (molecular) hydrogen bonding (electron exchange). The weighted Hansen solubility parameter" is calculated as $(\delta D^2+\delta P^2+\delta H^2)^{0.5}$, wherein $\delta D$ is the Hansen dispersion value (also referred to in the following as the atomic dispersion fore), OP is the Hansen polarizability value (also referred to in the following as the dipole moment), and OH is the Hansen Hydrogen-bonding ("h-bonding") value (also referred to in the following as hydrogen bonding). For a more detailed description of the parameters and values, see Charles Hansen, The Three Dimensional Solubility Parameter and Solvent Diffusion Coefficient, Danish Technical Press (Copenhagen, 1967).

Euclidean difference in solubility parameter between a fragrance and a solvent is calculated as $(4*(\delta D_{solvent} - \delta D_{fragrance})^2 + (\delta P_{solvent} - \delta P_{fragrance})^2 (\delta H_{solvent} - \delta H_{fragrance})^2)^{0.5}$, in which $\delta D_{solvent}$, $\delta P_{solvent}$, and $\delta H_{solvent}$, are the Hansen dispersion value, Hansen polarizability value, and Hansen h-bonding values of the solvent, respectively; and $\delta D_{fragrance}$, $\delta P_{fragrance}$, and $\delta H_{fragrance}$ are the Hansen dispersion value, Hansen polarizability value, and Hansen h-bonding values of the fragrance, respectively.

In a particular embodiment, the perfume oil and the hydrophobic solvent have at least two Hansen solubility parameters selected from a first group consisting of: an atomic dispersion force (OD) from 12 to 20, a dipole moment (OP) from 1 to 8, and a hydrogen bonding (OH) from 2.5 to 11.

In a particular embodiment, at least 90% of the perfume oil, preferably at least 95% of the perfume oil, most preferably at least of 98% of the perfume oil has at least two Hansen solubility parameters selected from a first group consisting of: an atomic dispersion force (OD) from 12 to 20, a dipole moment (OP) from 1 to 8, and a hydrogen bonding (OH) from 2.5 to 11.

In a particular embodiment, the perfume oil and the hydrophobic solvent have at least two Hansen solubility parameters selected from a second group consisting of: an atomic dispersion force (OD) from 12 to 20, preferably from 14 to 20, a dipole moment (OP) from 1 to 8, preferably from 1 to 7, and a hydrogen bonding (OH) from 2.5 to 11, preferably from 4 to 11.

In a particular embodiment, Perfuming formulation 1 as following is excluded from the present invention:

| Raw material | wt % |
| --- | --- |
| Romascone ®[a] | 20 |
| Verdox ™[b] | 20 |
| Lorysia ®[c] | 20 |
| 3-(4-isopropylphenyl)-2-methylpropanal | 20 |
| Salicynile ®[d] | 20 |

[a] Methyl 2,2-dimethyl-6-methylene-1-cyclohexanecarboxylate, origin: Firmenich SA, Geneva, Switzerland
[b] 2-tert-butyl-1-cyclohexyl acetate, trademark from International Flavors & Fragrances, USA
[c] 4-{1,1-dimethylethyl}-1-cyclohexyl acetate, origin: Firmenich SA, Geneva, Switzerland
[d] (2Z)-2-phenyl-2-hexenenitrile, origin: Firmenich SA, Geneva, Switzerland In a particular embodiment, Perfuming formulation 2 as following is excluded from the present invention:

| Raw mat | % in oil |
| --- | --- |
| Ethyl 2-methyl-pentanoate | 3.20% |
| Eucalyptol | 7.80% |
| 2,4-Dimethyl-3-cyclohexene-1-carbaldehyde [1] | 0.75% |
| Aldehyde C10 | 0.75% |
| Citronellyl Nitrile | 4.30% |
| Isobornyl acetate | 3.00% |
| Verdox ®[2] | 9.80% |
| Citronellyl Acetate | 1.30% |
| 2-Methylundecanal | 3.00% |
| Diphenyloxide | 0.80% |
| Aldehyde C12 | 1.30% |
| Dicyclopentadiene acetate | 9.85% |
| Ionone beta | 3.30% |
| Undecalactone gamma | 18.75% |
| Hexyl Salicylate | 15.90% |
| Benzyl Salicylate | 16.20% |
| TOTAL | 100% |

[1] Origin: Firmenich SA, Swtizwerland
[2] 2-tert-butyl-1-cyclohexyl acetate, origin and trademark from IFF, USA In a particular embodiment, Perfuming formulation 3 as following is excluded from the present invention:

| Component | % |
| --- | --- |
| ACETATE DE 4-(1,1-DIMETHYLETHYL)-1-CYCLOHEXYLE [1] | 14.50 |
| LINALOL BJ | 10.50 |
| LILIAL ®[2] | 10.00 |
| ISO E SUPER [3] | 10.00 |
| CITRONELLYL NITRILE | 9.00 |
| DIPHENYLOXYDE | 6.50 |
| ISOBORNYL ACETATE | 6.00 |
| BETA IONONE | 6.00 |
| TRICYCLO[5.2.1.0-2,6~]DEC-3-EN-8-YL ACETATE (A) + TRICYCLO[5.2.1.0-2,6~]DEC-4-EN-8-YL ACETATE (B) [4] | 5.50 |
| ETHER MT | 4.00 |
| HEDIONE ® [5] | 4.00 |
| GERANIOL 60 | 3.00 |
| CITRAL | 2.50 |
| ALDEHYDE C 10 | 2.50 |
| ALLYL HEPTANOATE | 2.50 |
| ETHYL METHYL-2-BUTYRATE | 1.50 |
| GERANYL ACETATE | 1.00 |
| 2,4-DIMETHYL-3-CYCLOHEXENE-1-CARBALDEHYDE [6] | 1.00 |

[1] Firmenich SA, Switzerland
[2] 3-(4-tert-butylphenyl)-2-methylpropanal, Givaudan SA, Vernier, Switzerland
[3] 1-(octahydro-2,3,8,8-tetramethyl-2-naphtalenyl)-1-ethanone, International Flavors & Fragrances, USA
[4] Firmenich SA, Switzerland
[5] Methyl dihydrojasmonate, Firmenich SA, Switzerland
[6] Firmenich SA, Switzerland In a particular embodiment, perfume formulation 4 as following is excluded from the present invention:

| Ingredient | Parts |
| --- | --- |
| Isopropyl myristate | 0.3 |
| (Z)-3-hexen-1-ol butyrate | 0.6 |
| Delta damascene | 1.0 |
| 2,4-Dimethyl-3-cyclohexene-1-carbaldehyde | 1.0 |
| Habanolide ® [1] | 3.0 |
| Hedione ® [2] | 5.0 |
| Hexyl cinnamic aldehyde | 12.0 |
| Iso E Super ®[3] | 16.0 |
| Verdyl acetate | 24.0 |
| Lilial ®[4] | 37.0 |

[1] Trademark from Firmenich; pentadecenolide, origin: Firmenich SA, Geneva, Switzerland
[2] Trademark from Firmenich: Methyl-cis-3-oxo-2-pentyl-1-cyclopentane acetate, origin: Firmenich SA, Geneva, Switzerland
[3] Trademark from IFF; 7-acetyl, 1,2,3,4,5,6,7,8-octahydro-1,1,6,7-tetramethyl naphthalene
[4] Trademark from Givaudan; 3-(4-tert-butylphenyl)-2-methylpropanal In a particular embodiment, perfume formulation 5 as following is excluded from the present invention:

| Raw Materials | % in oil |
| --- | --- |
| 2,4-Dimethyl-3-cyclohexene-1-carbaldehyde | 3.30% |
| Allyl Heptanoate | 5.50% |
| Allyl amyl glycolate | 10.99% |
| Delta Damascone | 1.65% |
| Verdyl acetate | 20.30% |
| Hedione ®[1] | 4.95% |
| Iso E Super ® [2] | 16.49% |
| Ald. Hexylcinnamique | 9.89% |
| Ethyl-2-methylvalerate | 3.3% |
| Lilial LG | 21.98% |
| Butyrate de Pipol | 1.1% |
| Ambrox ®[3] | 0.55% |
| Total | 100% |

[1] Methyl dihydrojasmonate, Firmenich SA, Geneva, Switzerland
[2] 1-(octahydro-2,3,8,8-tetramethyl-2-naphtalenyl)-1-ethanone, International Flavors & Fragrances, USA
[3] (−)-(8R)-8,12-epoxy-13,14,15,16-tetranorlabdane, Firmenich SA, Geneva, Switzerland In a particular embodiment, the delivery system has a biodegradability of at least 40%, preferably at least 60%, preferably at least 65%, 70%, 75%, 80%, 85%, 90%, 95% or 98% within 60 days according to OECD301F.

Thereby it is understood that the delivery system including all components, such as the biodegradable carrier and the perfume formulation, have a biodegradability of at least 40%, preferably at least 60%, preferably at least 65%, 70%, 75%, 80%, 85%, 90%, 95% or 98% within 60 days according to OECD301F.

In a particular embodiment, the delivery system has a stability or chemical stability of not more than 40%, preferably not more than 35%, preferably more than 30%, The stability or chemical stability of the delivery system being determined as not more than 40%, preferably not more than 35%, preferably not more than 30%, of the perfume leaking out of the microcapsules when incorporated in a consumer product for a particular storage time and temperature, with the microcapsules being stable after 15 days storage at 37° C., more preferably after 30 days storage at 37° C. preferably in fabric softeners, liquid detergents, body washes, deodorants or antiperspirants, for at least 2 weeks storage at 40° C. in body lotions, shampoos or hair conditioners.

Furthermore, the delivery system show a rubbing effect detectable on fresh samples, and preferably after 15 days of storage in application at 37° C., even more preferably after 30 days at 37° C.

The delivery system of the present invention can be used in combination with active ingredients.

An object of the invention is therefore a composition comprising:
(i) the delivery system as defined above;
(ii) an active ingredient, preferably chosen in the group consisting of a cosmetic ingredient, skin caring ingredient, perfume ingredient, flavor ingredient, malodour counteracting ingredient, bactericide ingredient, fungicide ingredient, pharmaceutical or agrochemical ingredient, a sanitizing ingredient, an insect repellent or attractant, and mixtures thereof.

The delivery system of the present invention can also be added in different perfumed consumer products In particular, the present invention relates to a perfuming composition comprising
the delivery system as described herein above and
optionally, a free perfume oil.

Preferably, the perfuming composition according to the invention comprises between 0.1 and 30% by weight of the delivery system as defined above.

By "free perfume" it is herein understood a perfume or perfume oil which is comprised in the perfuming composition and not entrapped in a delivery system.

In a particular embodiment, the total amount of the delivery system is 0.05 to 5 wt. % (based on the total weight of the perfuming composition) and the total amount of the free perfume oil is 0.05 to 5 wt. % (based on the total weight of the perfuming composition).

In a particular embodiment, the total perfume oil of the perfume formulation entrapped in the delivery system and total free perfume oil are present in the perfuming composition in a weight ratio of 1:20 to 20:1, preferably 10:1 to 1:10.

The perfuming composition can further comprise at least one perfuming co-ingredient and, optionally a perfumery adjuvant, By "perfuming co-ingredient" it is herein understood a compound, which is used in a perfuming preparation or a composition to impart a hedonic effect and which is not a microcapsule as 20 defined above. In other words such a co-ingredient, to be considered as being a perfuming one, must be recognized by a person skilled in the art as being able to impart or modify in a positive or pleasant way the odor of a composition, and not just as having an odor. The nature and type of the perfuming co-ingredients present in the perfuming composition do not warrant a more detailed description here, which in any case would not be exhaustive, the skilled person being 25 able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-30 ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said co-ingredients may also be compounds known to release in a controlled manner various types of perfuming compounds.

By "perfumery adjuvant" it is herein understood an ingredient capable of imparting additional 5 added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

According to an embodiment, the delivery system of the invention (first type of delivery system) can be used in combination with a second type of delivery system. Thus, according to a particular embodiment, the perfuming composition comprises:
the delivery system of the present invention as a first type of delivery system, and
a second type of delivery system, wherein the first type of delivery system and the second type of delivery system differ in their perfuming formulations and/or carrier material (shell or matrix) and/or outer coating.

The delivery system of the present invention can advantageously be used in many application fields and used in consumer products.

Therefore, in another aspect, the present invention relates to a perfumed consumer product comprising the delivery system according to the present invention or the perfuming composition according to the present invention.

Delivery systems can be used in liquid form applicable to liquid consumer products as well as in powder form, applicable to powder consumer products.

The consumer products of the invention, can in particular be of used in perfumed consumer products such as product belonging to fine fragrance or "functional" perfumery. Functional perfumery includes in particular personal-care products including hair-care, body cleansing, skin care, hygiene-care as well as home-care products including laundry care and air care.

In particular a liquid consumer product comprising:
from 2 to 65% by weight, relative to the total weight of the consumer product, of at least one surfactant;
water or a water-miscible hydrophilic organic solvent; and
a perfuming composition or delivery system as defined herein above.

Also a powder consumer product comprising
from 2 to 65% by weight, relative to the total weight of the consumer product, of at least one surfactant; and
a perfuming composition or delivery system as defined herein above.

For the sake of clarity, it has to be mentioned that, by "perfumed consumer product" it is meant a consumer product which is expected to deliver among different benefits a perfuming effect to the surface to which it is applied (e.g. skin, hair, textile, paper, or home surface) or in the air (air-freshener, deodorizer etc). In other words, a perfumed consumer product according to the invention is a manufactured product which comprises a functional formulation also referred to as "base", together with benefit agents, among which an effective amount of microcapsules according to the invention.

The nature and type of the other constituents of the perfumed consumer product do not warrant a more detailed description here, which in any case would not be exhaustive, the skilled person being able to select them on the basis of his general knowledge and according to the nature and the desired effect of said product. Base formulations of consumer products in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Non-limiting examples of suitable perfumed consumer products can be a fine perfume, a splash or eau de perfume, a cologne, a shave or after-shave lotion, a liquid or solid detergent, a mono or multi chamber unidose detergent, a fabric softener, a fabric refresher, liquid or solid scent-boosters (PEG/urea or salts), a dryer sheet, an ironing water, a paper, a bleach, a carpet cleaners, curtain-care products, a shampoo, a coloring preparation, a color care product, a hair shaping product, a dental care product, a disinfectant, an intimate care product, a hair spray, a hair conditioning product, a vanishing cream, a deodorant or antiperspirant, hair remover, tanning or sun product, nail products, skin cleansing, a makeup, a perfumed soap, shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, a car care product.

In a particular embodiment, the perfumed consumer product is a liquid or solid detergent, a fabric softener, liquid or solid scent-boosters (e.g. using PEG/urea or salts), a shampoo, a shower gel, a hair conditioning product (e.g. leave-on or rinse-off), a deodorant or antiperspirant.

Another object of the invention is a consumer product comprising:
a personal care active base, and
the delivery system as defined above or the perfuming composition as defined above,
wherein the consumer product is in the form of a personal care composition.

Personal care active base in which the delivery system of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

The personal care composition is preferably chosen in the group consisting of a hair-care product (e.g. a shampoo, hair conditioner, a colouring preparation or a hair spray), a cosmetic preparation (e.g. a vanishing cream, body lotion or a deodorant or antiperspirant), a skin-care product (e.g. a perfumed soap, shower or bath mousse, body wash, oil or gel, bath salts, or a hygiene product), oral care product (toothpaste or mouthwash composition) or a fine fragrance product (e.g. Eau de Toilette—EdT).

Another object of the invention is a consumer product comprising:
a home care or a fabric care active base, and
the delivery system as defined above or the perfuming composition as defined above,
wherein the consumer product is in the form of a home care or a fabric care composition.

Home care or fabric care bases in which the delivery system of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

The home or fabric care composition is preferably chosen in the group consisting fabric softener, liquid detergent, powder detergent, liquid scent booster and solid scent booster.

Fabric Softener

An object of the invention is a consumer product in the form of a fabric softener composition comprising:
a fabric softener active base; preferably chosen in the group consisting of dialkyl quaternary ammonium salts, dialkyl ester quaternary ammonium salts (esterquats), Hamburg esterquat (HEQ), TEAQ (triethanolamine quat), silicones, cationic guars and mixtures thereof, preferably in an amount comprised between 85 and 99.95% by weight based on the total weight of the composition,
the delivery system as defined above, preferably in an amount comprised between 0.05 to 15 wt %, more preferably between 0.1 and 5 wt % by weight based on the total weight of the composition.

Liquid Detergent

An object of the invention is a consumer product in the form of a liquid detergent composition comprising:

a liquid detergent active base; preferably chosen in the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and non-ionic surfactant such as alkyl amines, alkanolamide, fatty alcohol poly(ethylene glycol) ether, fatty alcohol ethoxylate (FAE), ethylene oxide (EO) and propylene oxide (PO) copolymers, amine oxydes, alkyl polyglucosides, alkyl polyglucosamides, preferably in an amount comprised between 85 and 99.95% by weight based on the total weight of the composition, the delivery system as defined above, preferably in an amount comprised between 0.05 to 15 wt %, more preferably between 0.1 and 5 wt % by weight based on the total weight of the composition.

Solid Detergent

An object of the invention is a consumer product in the form of a solid detergent composition comprising:

a solid detergent active base; preferably chosen in the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and non-ionic surfactant such as alkyl amines, alkanolamide, fatty alcohol poly(ethylene glycol) ether, fatty alcohol ethoxylate (FAE), ethylene oxide (EO) and propylene oxide (PO) copolymers, amine oxydes, alkyl polyglucosides, alkyl polyglucosamides, preferably in an amount comprised between 85 and 99.95% by weight based on the total weight of the composition, the delivery system as defined above, preferably in an amount comprised between 0.05 to 15 wt %, more preferably between 0.1 and 5 wt % by weight based on the total weight of the composition.

Solid Scent Booster

An object of the invention is a consumer product in the form of a solid scent booster comprising:

a solid carrier, preferably chosen in the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides such as sucrose, mono-, di-, and polysaccharides and derivatives such as starch, cellulose, methyl cellulose, ethyl cellulose, propyl cellulose, polyols/sugar alcohols such as sorbitol, maltitol, xylitol, erythritol, and isomalt, PEG, PVP, citric acid or any water soluble solid acid, fatty alcohols or fatty acids and mixtures thereof.

the delivery system as defined above, in a powdered form, preferably in an amount comprised between 0.05 to 15 wt %, more preferably between 0.1 and 5 wt % by weight based on the total weight of the composition.

Liquid Scent Booster

An object of the invention is a consumer product in the form of a liquid scent booster comprising:

an aqueous phase, a surfactant system essentially consisting of one or more than one non-ionic surfactant, wherein the surfactant system has a mean HLB between 10 and 14, preferably chosen in the group consisting of ethoxylated aliphatic alcohols, POE/PPG (polyoxyethylene and polyoxypropylene) ethers, mono and polyglyceryl esters, sucrose ester compounds, polyoxyethylene hydroxylesters, alkyl polyglucosides, amine oxides and combinations thereof;

a linker chosen in the group consisting of alcohols, salts and esters of carboxylic acids, salts and esters of hydroxyl carboxylic acids, fatty acids, fatty acid salts, glycerol fatty acids, surfactant having an HLB less than 10 and mixtures thereof, and the delivery system as defined above, in the form of a slurry, preferably in an amount comprised between 0.05 to 15 wt %, more preferably between 0.1 and 5 wt % by weight based on the total weight of the composition.

Shampoo/Shower Gel

An object of the invention is a consumer product in the form of a shampoo or a shower gel composition comprising:

a shampoo or a shower gel active base; preferably chosen in the group consisting of sodium alkylether sulfate, ammonium alkylether sulfates, alkylamphoacetate, cocamidopropyl betaine, cocamide MEA, alkylglucosides and aminoacid based surfactants and mixtures thereof, preferably in an amount comprised between 85 and 99.95% by weight based on the total weight of the composition, the delivery system as defined above, preferably in an amount comprised between 0.05 to 15 wt %, more preferably between 0.1 and 5 wt % by weight based on the total weight of the composition.

Rinse-Off Conditioner

An object of the invention is a consumer product in the form of a rinse-off conditioner composition comprising:

a rinse-off conditioner active base; preferably chosen in the group consisting of cetyltrimonium chloride, stearyl trimonium chloride, benzalkonium chloride, behentrimonium chloride and mixture thereof, preferably in an amount comprised between 85 and 99.95% by weight based on the total weight of the composition, the delivery system as defined above, preferably in an amount comprised between 0.05 to 15 wt %, more preferably between 0.1 and 5 wt % by weight based on the total weight of the composition.

Perfuming Composition

According to a particular embodiment, the consumer product is in the form of a perfuming composition comprising:

0.1 to 30%, preferably 0.1 to 20% of the delivery system as defined above, 0 to 40%, preferably 3-40% of perfume, and 20-90, preferably 40-90% of ethanol, by weight based on the total weight of the perfuming composition.

The invention will now be further described by way of examples. It will be appreciated that the invention as claimed is not intended to be limited in any way by these examples

EXAMPLES

General Protocol for Preparing Microcapsules

Protocol 1

Aqueous solutions of 10% wt. pork gelatine (A), and 10% wt. gum Arabic (B) are prepared separately.

The fragrance (Perfume A, B, C, D) to be encapsulated is mixed with a given amount of poly-isocyanate (trimethylol propane-adduct of xylylene diisocyanate, Takenate® D-110N, Mitsui Chemical) (C).

In a vessel at 40° C., the solution (A) and the solution (B) are added to warm demineralised water under mechanical shear. pH is adjusted to 4.45 using HCl 1M. The mixture is maintained at 40° C. during 15 min.

The solution (C) is slowly added to the mixture and emulsified/homogenised by mechanical shear forces (impeller, disperser, turbine etc. . . . ) at a given rate to reach the desired average droplet size. Mechanical shear is maintained at the same rate and the solution is then subjected to a thermal treatment at 50-90° C. After a duration between 30 to 240 min, the mixture is cooled down to 10° C. at a controlled rate between 0.2 and 0.3° C.min$^{-1}$. The stirring speed is slightly decreased, and a cross-linking agent (glutaraldehyde aq.50% wt. Supplied by Sigma-Aldrich) is finally added to the mixture. The capsule suspension is mixed during 4 to 10 hours at 20-25° C. to allow a complete reaction.

The result is an aqueous suspension of microcapsules.

Protocol 2

Aqueous solutions of 10% wt. pork gelatine (A), and 10% wt. gum Arabic (B) are prepared separately.

The fragrance (Perfume A, B, C, D) to be encapsulated is mixed with a given amount of poly-isocyanate (trimethylol propane-adduct of xylylene diisocyanate, Takenate® D-110N, Mitsui Chemical) (C).

In a vessel at 40° C., the solution (A) and the solution (B) are added to warm demineralised water under mechanical shear.

The solution (C) is slowly added to the mixture and emulsified/homogenised by mechanical shear forces (impeller, disperser, turbine etc. . . . ) at a given rate to reach the desired average droplet size. pH is adjusted to 4.45 using HCl 1M. The mixture is kept at 40° C. during 15 min. Mechanical shear is maintained at the same rate and the solution is then subjected to a thermal treatment at 50-90° C. After a duration between 30 to 240 min, the mixture is cooled down to 10° C. at a controlled rate between 0.2 and 0.3° C.min$^{-1}$. The stirring speed is slightly decreased, and a cross-linking agent (glutaraldehyde aq.50% wt. Supplied by Sigma-Aldrich) is finally added to the mixture. The capsule suspension is mixed during 4 to 10 hours at 20-25° C. to allow a complete reaction.

The result is an aqueous suspension of microcapsules.

Protocol 3

An aqueous solution of 10% wt. pork gelatine (A) is prepared separately.

A fragrance (Perfume A, B, C, D) to be encapsulated is mixed with poly-isocyanate (trimethylol propane-adduct of xylylene diisocyanate, Takenate® D-110N, Mitsui Chemical) (B). Gum Arabic is dissolved in demineralised water to form the aqueous phase. The mixture is stirred until complete solubilisation and warmed at 40° C. Solution (B) is dispersed in the aqueous phase and emulsified by mechanical shear, static mixer, rotor-stator or rotor-rotor to obtain the desired particle size. Solution (A) is then added to the mixture under continued mechanical shear, the pH is adjusted to 4.45 using HCl 1M and maintained as such during 10 min.

Mechanical shear is maintained at the same rate and the solution is then subjected to a thermal treatment at 50-90° C. After a duration between 30 to 240 min, the mixture is cooled down to 10° C. at a controlled rate between 0.2 and 0.3° C.min$^{-1}$. The stirring speed is slightly decreased, and a cross-linking agent (glutaraldehyde aq.50% wt. Supplied by Sigma-Aldrich) is finally added to the mixture. The capsule suspension is mixed during 4 to 10 hours at 20-25° C. to allow a complete reaction.

The result is an aqueous suspension or slurry of microcapsules.

TABLE 1

Perfume oil A

| Ingredient | % in formula | Log P | Log ODT | Group | δD | δP | δH |
| --- | --- | --- | --- | --- | --- | --- | --- |
| (+−)-ETHYL 2-METHYLBUTANOATE | 2.2% | <3 | >−4 | | 12-20 | 1-8 | 2.5-11 |
| 2-PHENYLETHYL ACETATE | 2.4% | <3 | >−4 | 3 | 12-20 | 1-8 | 2.5-11 |
| 1-METHOXY-4-METHYLBENZENE | 0.5% | <3 | >−4 | | 12-20 | 1-8 | 2.5-11 |
| HEXYL ACETATE | 11.70% | <3 | >−4 | | 12-20 | 1-8 | 2.5-11 |
| TRICYCLO[5.2.1.0-2,6~]DEC-3-EN-8-YL ACETATE (A) + TRICYCLO[5.2.1.0~2,6~]DEC-4-EN-8-YL ACETATE (B) | 28.5% | <3 | >−4 | 5 | 12-20 | 1-8 | 2.5-11 |
| (1RS,2RS)-2,4-DIMETHYL-3-CYCLOHEXENE-1-CARBALDEHYDE (A) + (1RS,2SR)-2,4-DIMETHYL-3-CYCLOHEXENE-1-CARBALDEHYDE (B) | 3.15% | <3 | >−4 | 1 | 12-20 | 1-8 | 2.5-11 |
| METHYL 2-((1RS,2RS)-3-OXO-2-PENTYLCYCLOPENTYL)ACETATE | 1.0% | <3 | >−4 | 2 | 12-20 | 1-8 | 2.5-11 |
| (+−)-2,6-DIMETHYL-5-HEPTENAL | 0.1% | 3-3.5 | >−4 | | 12-20 | 1-8 | 2.5-11 |
| (+−)-2,6-DIMETHYL-7-OCTEN-2-OL | 9.5% | 3-3.5 | >−4 | | 12-20 | 1-8 | 2.5-11 |
| 3,7-DIMETHYL-2,6-OCTADIEN-1-OL | 1.9% | 3-3.5 | >−4 | | 12-20 | 1-8 | 2.5-11 |
| (2RS,4SR)-4-METHYL-2-(2-METHYL-1-PROPEN-1-YL)TETRAHYDRO-2H-PYRAN (A) + (2RS,4RS)-4-METHYL-2-(2-METHYL-1-PROPEN-1-YL)TETRAHYDRO-2H-PYRAN (B) | 0.75% | >3.5 | >−4 | 1 | 12-20 | 1-8 | 2.5-11 |
| 3-(4,4-DIMETHYL-1-CYCLOHEXEN-1-YL)PROPANAL | 0.25% | >3.5 | >−4 | | 12-20 | 1-8 | 2.5-11 |
| 1,1'-OXYDIBENZENE | 2.35% | >3.5 | >−4 | 3 | >20 | 1-8 | 2.5-11 |

TABLE 1-continued

Perfume oil A

| Ingredient | % in formula | Log P | Log ODT | Group | δD | δP | δH |
|---|---|---|---|---|---|---|---|
| (+−)-(E)-4-METHYL-3-DECEN-5-OL | 4.75% | >3.5 | >−4 | | 12-20 | 1-8 | 2.5-11 |
| (2E)-1-[(1RS,2SR)-2,6,6-TRIMETHYL-3-CYCLOHEXEN-1-YL]-2-BUTEN-1-ONE | 1.45% | >3.5 | <−4 | 3 | 12-20 | 1-8 | 2.5-11 |
| (+−)-1,5-DIMETHYL-1-VINYL-4-HEXENYL ACETATE | 2.85% | >3.5 | >−4 | | 12-20 | 1-8 | 2.5-11 |
| (3E)-4-(2,6,6-TRIMETHYL-1-CYCLOHEXEN-1-YL)-3-BUTEN-2-ONE | 0.40% | >3.5 | <−4 | 3 | 12-20 | 1-8 | 2.5-11 |
| 2-METHYLBUTYL SALICYLATE (A) + PENTYL SALICYLATE (B) | 3.80% | >3.5 | >−4 | 3 | 12-20 | 1-8 | 2.5-11 |
| (+−)-2-METHYLUNDECANAL | 13.90% | >3.5 | <−4 | | 12-20 | 1-8 | 2.5-11 |
| HEXYL 2-HYDROXYBENZOATE | 8.55% | >3.5 | >−4 | 3 | 12-20 | 1-8 | 2.5-11 |
| Total | 100% | | | | | | |
| Log P > 3 * | | | | 50.6% | | | |
| Log P > 3.5 * | | | | 39.1% | | | |
| Log T < −4 * | | | | 15.8% | | | |
| Group 1-6 * | | | | 52.4% | | | |
| Group 3-6 * | | | | 47.5% | | | |
| HSP | | | | 100% | | | |

* excluding hydrophobic solvent

TABLE 2

Variations of Perfume oil A with more hydrophobic and density adjuster solvents

| Perfume | A | A1 | A2 |
|---|---|---|---|
| Parts Perfume A | 97% | 70% | 50% |
| METHYL DIHYDROABIETATE (A) + METHYL ABIETATE (B) + METHYL DEHYDROABIETATE (C) + METHYL TETRAHYDROABIETATE (D) | 3% | 15% | 25% |
| CYCLOHEXYL SALICYLATE | 0% | 15% | 25% |

TABLE 3

Perfume oil B

| Ingredient | % in formula | Log P | Log ODT | Group | δD | δP | δH |
|---|---|---|---|---|---|---|---|
| (Z)-3-HEXEN-1-OL | 0.20% | <3 | >−4 | | 12-20 | 1-8 | >11 |
| (2-METHOXYETHYL)BENZENE | 1.40% | <3 | >−4 | | 12-20 | 1-8 | 2.5-11 |
| TRICYCLO[5.2.1.0~2,6~]DEC-3-EN-8-YL ACETATE (A) + TRICYCLO[5.2.1.0~2,6~]DEC-4-EN-8-YL ACETATE (B) | 30.00% | <3 | >−4 | 5 | 12-20 | 1-8 | 2.5-11 |
| (+−)-2,6-DIMETHYL-5-HEPTENAL | 0.75% | 3-3.5 | >−4 | | 12-20 | 1-8 | 2.5-11 |
| 1,3,3-TRIMETHYL-2-OXABICYCLO[2.2.2]OCTANE | 3.20% | 3-3.5 | >−4 | 5 | 12-20 | 1-8 | 2.5-11 |
| (+)-4-METHYLENE-2-PHENYLTETRAHYDRO-2H-PYRAN (A) + (+−)-4-METHYL-6-PHENYL-3,6-DIHYDRO-2H-PYRAN (B) + (+−)-4-METHYL-2-PHENYL-3,6-DIHYDRO-2H-PYRAN (C) | 1.30% | 3-3.5 | <−4 | 3 | 12-20 | 1-8 | 2.5-11 |
| .ALPHA.-DIHYDROTERPINEOL (A) + BETA.-DIHYDROTERPINEOL (B) | 9.45% | 3-3.5 | >−4 | 1 | 12-20 | 1-8 | 2.5-11 |
| (2RS,4SR)-4-METHYL-2-(2-METHYL-1-PROPEN-1-YL)TETRAHYDRO-2H-PYRAN (A) + (2RS,4RS)-4-METHYL-2-(2-METHYL-1-PROPEN-1-YL)TETRAHYDRO-2H-PYRAN (B) | 5.50% | >3.5 | >−4 | 1 | 12-20 | 1-8 | 2.5-11 |
| (+−)-3,7-DIMETHYL-1-OCTANOL | 0.20% | >3.5 | >−4 | | 12-20 | 1-8 | 2.5-11 |
| 2-UNDECANONE | 5.50% | >3.5 | >−4 | | 12-20 | 1-8 | 2.5-11 |
| 2-METHOXY-3-(4-METHYLPENTYL)PYRAZINE | 0.10% | >3.5 | <−4 | | 12-20 | 1-8 | 2.5-11 |
| (+−)-3-(3-ISOPROPYL-1-PHENYL)BUTANAL | 1.30% | >3.5 | <−4 | 3 | 12-20 | 1-8 | 2.5-11 |
| 3-(4-ETHYLPHENYL)-2,2-DIMETHYLPROPANAL (A) + 3-(2-ETHYLPHENYL)-2,2-DIMETHYLPROPANAL (B) | 2.85% | >3.5 | <−4 | 3 | 12-20 | 1-8 | 2.5-11 |
| 10-UNDECENAL (A) + (9E)-9-UNDECENAL (B) + (9Z)-9-UNDECENAL (C) | 2.85% | >3.5 | <−4 | | 12-20 | 1-8 | 2.5-11 |

TABLE 3-continued

| Perfume oil B | | | | | | | |
|---|---|---|---|---|---|---|---|
| Ingredient | % in formula | Log P | Log ODT | Group | δD | δP | δH |
| (+−)-(E)-4-METHYL-3-DECEN-5-OL | 13.60% | >3.5 | >−4 | | 12-20 | 1-8 | 2.5-11 |
| (2E)-1-[(1RS,2SR)-2,6,6-TRIMETHYL-3-CYCLOHEXEN-1-YL]-2-BUTEN-1-ONE | 0.60% | >3.5 | <−4 | 3 | 12-20 | 1-8 | 2.5-11 |
| 8-ISOPROPYL-6-METHYL-BICYCLO[2.2.2]OCT-5-ENE-2-CARBALDEHYDE | 0.10% | >3.5 | <−4 | 5 | 12-20 | 1-8 | 2.5-11 |
| 1-(5,5-DIMETHYL-1-CYCLOHEXEN-1-YL)-4-PENTEN-1-ONE | 1.30% | >3.5 | <−4 | 3 | 12-20 | 1-8 | 2.5-11 |
| (+−)-2-METHYLUNDECANAL | 13.60% | >3.5 | <−4 | | 12-20 | 1-8 | 2.5-11 |
| (+−)-2-(4-METHYL-3-CYCLOHEXEN-1-YL)-2-PROPANETHIOL | 0.10% | >3.5 | <−4 | 1 | 12-20 | 1-8 | 2.5-11 |
| (−)-(3AR,5AS,9AS,9BR)-3A,6,6,9A-TETRAMETHYLDODECAHYDRONAPHTHO[2,1-B]FURAN | 0.60% | >3.5 | <−4 | 4 | 12-20 | 1-8 | 2.5-11 |
| (2Z)-1,1-DIETHOXY-3,7-DIMETHYL-2,6-OCTADIENE (A) + (2E)-1,1-DIETHOXY-3,7-DIMETHYL-2,6-OCTADIENE (B) | 4.05% | >3.5 | >−4 | | 12-20 | 1-8 | 2.5-11 |
| CLEARWOOD ® | 1.45% | >3.5 | <−4 | 5 | 12-20 | 1-8 | 2.5-11 |
| TOTAL | 100% | | | | | | |

| | |
|---|---|
| Log P > 3: | 68.4% |
| Log P > 3.5 | 53.7% |
| Log T >− 4 | 23.3% |
| Group 1-6 | 57.8% |
| Group 3-6 | 42.7% |
| HSP | 100% |

TABLE 4

Variations of Perfume oil B with more hydrophobic and density adjuster solvent

| Perfume | B | B1 | B2 |
|---|---|---|---|
| Parts Perfume B | 100% | 75% | 50% |
| Phenylethyl Phenylacetate | 0% | 2.5% | 5% |
| Cyclohexyl salicylate | 0% | 22.5% | 45% |

TABLE 5

| Perfume oil C | | | | | | | |
|---|---|---|---|---|---|---|---|
| Ingredient | % in formula | Log P | Log ODT | Group | δD | δP | δH |
| (Z)-3-HEXENYL ACETATE | 1.15% | <3 | >−4 | | 12-20 | 1-8 | 2.5-11 |
| (1RS,2RS)-2,4-DIMETHYL-3-CYCLOHEXENE-1-CARBALDEHYDE (A) + (1RS,2SR)-2,4-DIMETHYL-3-CYCLOHEXENE-1-CARBALDEHYDE (B) | 5.70% | <3 | >−4 | 1 | 12-20 | 1-8 | 2.5-11 |
| METHYL 2-((1RS,2RS)-3-OXO-2-PENTYLCYCLOPENTYL) ACETATE | 2.60% | <3 | >−4 | 2 | 12-20 | 1-8 | 2.5-11 |
| (+−)-5-HEPTYLDIHYDRO-2(3H)-FURANONE | 8.00% | 3-3.5 | <−4 | | 12-20 | 1-8 | 2.5-11 |
| 1,3,3-TRIMETHYL-2-OXABICYCLO[2.2.2]OCTANE | 6.10% | 3-3.5 | >−4 | 5 | 12-20 | 1-8 | 2.5-11 |
| 2-METHOXYNAPHTHALENE | 8.00% | 3-3.5 | <−4 | 4 | >20 | 1-8 | 2.5-11 |
| 3,5,6-TRIMETHYL-3-CYCLOHEXENE-1-CARBALDEHYDE (A) + 2,4,6-TRIMETHYL-3-CYCLOHEXENE-1-CARBALDEHYDE (B) | 1.05% | 3-3.5 | >−4 | 1 | 12-20 | 1-8 | 2.5-11 |
| (Z)-3-HEXENYL ISOBUTYRATE | 0.65% | >3.5 | >−4 | | 12-20 | 1-8 | 2.5-11 |
| 3,7-DIMETHYL-2,6-NONADIENENITRILE (A) + 3,7-DIMETHYL-3,6-NONADIENENITRILE (B) | 12.40% | >3.5 | >−4 | | 12-20 | 1-8 | 2.5-11 |

TABLE 5-continued

Perfume oil C

| Ingredient | % in formula | Log P | Log ODT | Group | δD | δP | δH |
|---|---|---|---|---|---|---|---|
| (1R,2R)-1,7,7-TRIMETHYL-BICYCLO[2.2.1]HEPT-2-YL ACETATE | 12.75% | >3.5 | >−4 | 5 | 12-20 | 1-8 | 2.5-11 |
| 10-UNDECENAL (A) + (9E)-9-UNDECENAL (B) + (9Z)-9-UNDECENAL (C) | 1.35% | >3.5 | <−4 | | 12-20 | 1-8 | 2.5-11 |
| (−)-(1S)-2,6,6-TRIMETHYL-BICYCLO[3.1.1]HEPT-2-ENE | 3.25% | >3.5 | >−4 | | 12-20 | <1 | 2.5-11 |
| (+−)-1,5-DIMETHYL-1-VINYL-4-HEXENYL ACETATE | 12.40% | >3.5 | >−4 | | 12-20 | 1-8 | 2.5-11 |
| 1-(5,5-DIMETHYL-1-CYCLOHEXEN-1-YL)-4-PENTEN-1-ONE | 1.60% | >3.5 | <−4 | 3 | 12-20 | 1-8 | 2.5-11 |
| 37-DIMETHYL-6-OCTENYL ACETATE | 4.75% | >3.5 | >−4 | | 12-20 | 1-8 | 2.5-11 |
| (+−)-2-METHYLUNDECANAL | 8.00% | >3.5 | <−4 | | 12-20 | 1-8 | 2.5-11 |
| (+−)-2-(4-METHYL-3-CYCLOHEXEN-1-YL)-2-PROPANETHIOL | 0.10% | >3.5 | <−4 | 1 | 12-20 | 1-8 | 2.5-11 |
| (+−)-(3E)-3-METHYL-4-(2,6,6-TRIMETHYL-2-CYCLOHEXEN-1-YL)-3-BUTEN-2-ONE (A) + (+−)-(1E)-1-(2,6,6-TRIMETHYL-2-CYCLOHEXEN-1-YL)-1-PENTEN-3-ONE (B) | 0.65% | >3.5 | <−4 | 3 | 12-20 | 1-8 | 2.5-11 |
| 1-OXA-12-CYCLOHEXADECEN-2-ONE (A) + 1-OXA-13-CYCLOHEXADECEN-2-ONE (B) | 4.75% | >3.5 | >−4 | 6 | 12-20 | 1-8 | 2.5-11 |
| OXACYCLOHEXADECAN-2-ONE | 4.75% | >3.5 | >−4 | 6 | 12-20 | 1-8 | 2.5-11 |
| TOTAL | 100.00% | | | | | | |

Log P > 3:     90.6%
Log P > 3.5:   67.4%
Log T <− 4:    28.6%
Group 1-6:     49.7%
Group 3-6:     39.9%
HSP            100%

TABLE 6

Variations of Perfume oil C with more hydrophobic and density adjuster solvent

| Perfume | C | C1 | C2 |
|---|---|---|---|
| Parts Perfume C | 100% | 80% | 55% |
| Benzyl salicylate | 0% | 20% | 45% |

TABLE 7

Perfume oil D

| Ingredient | % in formula | Log P | Log ODT | Group | δD | δP | δH |
|---|---|---|---|---|---|---|---|
| OCTANAL | 2.50% | <3 | >−4 | | 12-20 | 1-8 | 2.5-11 |
| 1,3,3-TRIMETHYL-2-OXABICYCLO[2.2.2]OCTANE | 2.10% | 3-3.5 | >−4 | 5 | 12-20 | 1-8 | 2.5-11 |
| 2-METHOXYNAPHTHALENE | 10.00% | 3-3.5 | <−4 | 4 | >20 | 1-8 | 2.5-11 |
| (+−)-4-METHYLENE-2-PHENYLTETRAHYDRO-2H-PYRAN (A) + (+−)-4-METHYL-6-PHENYL-3,6-DIHYDRO-2H-PYRAN (B) + (+−)-4-METHYL-2-PHENYL-3,6-DIHYDRO-2H-PYRAN (C) | 3.00% | 3-3.5 | <−4 | 3 | 12-20 | 1-8 | 2.5-11 |
| DECANAL | 5.00% | >3.5 | >−4 | | 12-20 | 1-8 | 2.5-11 |
| (+−)-3,7-DIMETHYL-6-OCTENAL | 30.00% | >3.5 | >−4 | | 12-20 | 1-8 | 2.5-11 |
| (+)-(3S)-3-[(1R)-4-METHYL-3-CYCLOHEXEN-1-YL]BUTANAL (A) + (+−)-(3R)-3-[(1R)-4-METHYL-3-CYCLOHEXEN-1-YL]BUTANAL | 10.00% | >3.5 | >−4 | 3 | 12-20 | 1-8 | 2.5-11 |

TABLE 7-continued

Perfume oil D

| Ingredient | % in formula | Log P | Log ODT | Group | δD | δP | δH |
|---|---|---|---|---|---|---|---|
| (1R,2R)-1,7,7-TRIMETHYL-BICYCLO[2.2.1]HEPT-2-YL ACETATE | 5.00% | >3.5 | >-4 | 5 | 12-20 | 1-8 | 2.5-11 |
| 8-ISOPROPYL-6-METHYL-BICYCLO[2.2.2]OCT-5-ENE-2-CARBALDEHYDE | 0.60% | >3.5 | <-4 | 5 | 12-20 | 1-8 | 2.5-11 |
| (+-)-2-METHYLUNDECANAL | 8.00% | >3.5 | <-4 | | 12-20 | 1-8 | 2.5-11 |
| (-)-(3AR,5AS,9AS,9BR)-3A,6,6,9A-TETRAMETHYLDODECAHYDRONAPHTHO[2,1-B]FURAN | 0.70% | >3.5 | <-4 | 4 | 12-20 | 1-8 | 2.5-11 |
| (2Z)-1,1-DIETHOXY-3,7-DIMETHYL-2,6-OCTADIENE (A) + (2E)-1,1-DIETHOXY-3,7-DIMETHYL-2,6-OCTADIENE (B) | 20.00% | >3.5 | >-4 | | 12-20 | 1-8 | 2.5-11 |
| (2Z)-2-TRIDECENENITRILE (A) + (3Z)-3-TRIDECENENITRILE (B) + (3E)-3-TRIDECENENITRILE (C) + (2E)-2-TRIDECENENITRILE (D) | 2.00% | >3.5 | <-4 | | 12-20 | 1-8 | 2.5-11 |
| PATCHOULI OIL | 1.10% | >3.5 | <-4 | 5 | 12-20 | 1-8 | 2.5-11 |
| TOTAL | 100% | | | | | | |

| | |
|---|---|
| Log P > 3: | 97.5% |
| Log P > 3.5: | 82.4% |
| Log T <-4 | 25.4% |
| Group 1-6 | 32.5% |
| Group 3-6 | 32.5% |
| HSP | 100% |

TABLE 8

Variations of Perfume oil D with more hydrophobic & density adjuster solvent

| Perfume | D | D1 | D2 |
|---|---|---|---|
| Parts Perfume D | 100% | 75% | 50% |
| Phenylethyl Phenylacetate | 0% | 2.5% | 5% |
| Cyclohexyl salicylate | 0% | 22.5% | 45% |

Example 1

Preparation of Microcapsules Slurry

Microcapsules A-D have been prepared by using Protocol 3. Similar results have been obtained by using Protocol 1 and 2.

TABLE 9

Microcapsules compositions

| Components | A | B | C | D |
|---|---|---|---|---|
| Water | 74.8 | 74.8 | 74.8 | 74.8 |
| Gum arabic[1] | 1.1 | 1.1 | 1.1 | 1.1 |
| Gelatine[2] | 1.1 | 1.1 | 1.1 | 1.1 |
| Perfume[3] | 22.1 (Perfume A) | 22.1 (Perfume B) | 22.1 (Perfume C) | 22.1 (Perfume D) |
| Takenate ®[4] | 0.40 | 0.40 | 0.40 | 0.40 |
| Lactic acid[5] | 0.5 | 0.5 | 0.5 | 0.5 |
| Glutaraldehyde[6] | 0.04 | 0.04 | 0.04 | 0.04 |
| Particle size (microns) | 72 | 72 | 72 | 72 |
| Weight ratio in the slurry between coacervate and polyisocyanate | 88:12 | 88:12 | 88:12 | 88:12 |
| Weight concentration of the polyisocyanate in theslurry | 0.30% | 0.30% | 0.30% | 0.30% |

[1] Nexira
[2] PB Leiner
[3] See tables 1, 3, 5 & 7
[4] Trimethylol propane-adduct of xylylene diisocyanate, origin: Mitsui Chemicals, Inc., Japan, 75% solution of polyisocyanate in ethyl acetate
[5] Purac Biochem, 90% aqueous solution
[6] Sigma Aldrich, 50% aqueous solution Some of the microcapsules slurries (A, B, C and D) were mixed then with preservatives and thickening polymers (0.5% sodium benzoate and 0.1 to 0.5% xanthan gum).

Example 2

Stability Performance in a Fabric Softener Composition

Capsules of the present invention were dispersed in fabric softener base described in table 10 to obtain a concentration of encapsulated perfume oil at 0.22% and stability was evaluated after 1 month at the elevated temperature of 37° C.

TABLE 10

Fabric Softener composition

| Product | Wt % |
|---|---|
| Stepantex VL 90A | 8.88 |
| Calcium Chloride Sol. 10% | 0.36 |

TABLE 10-continued

Fabric Softener composition

| Product | Wt % |
|---|---|
| Proxel GXL | 0.04 |
| Perfume | 1 |
| Water | 89.72 |
| TOTAL | 100 |

Protocol for the Stability Assessment

Weigh 1 g of sample into a 20 mL scintillation vial. Add 4 mL of water and mix for 5 min at 480 rpm on an IKA KS130 orbital shaker. Add 5 mL of extraction solvent (90% isooctane/10% ether with 150 ppm 1,4-dibromobenzene) and mix for 15 min at 480 rpm on an IKA KS130 orbital shaker. Transfer to a 15 mL centrifuge tube and spin for 60 min at 6000 rcf. Analyze the supernatant with a Shimatzu GCMS (model) or equivalent. All samples are compared to a free oil reference control which corresponds to 100% leakage.

TABLE 11

Results from the stability assessment

| % Perfume Leakage after storage in softener | Capsule A | Capsule B | Capsule C | Capsule D |
|---|---|---|---|---|
| 15 days at 37° C. | 33% | 28% | 31% | 24% |
| 1 Month at 37° C. | 43% | 37% | 40% | 32% |
| 15 days at 43° C. | 43% | 36% | 38% | 30% |
| 1 Month at 43° C. | 55% | 47% | 50% | 39% |

One can conclude from Table 11, all capsules exhibit reasonable perfume leakage upon extended storage in fabric-softener, even at very elevated temperature like 43° C.

Example 3

Liquid Detergent Composition

A sufficient amount of microcapsule slurry A-D of the present invention was dispersed in liquid detergent base described in table 12 to obtain a concentration of encapsulated perfume oil at 0.22%.

TABLE 12

Composition of the liquid detergent formulation

| Ingredients | Concentration [wt %] |
|---|---|
| Sodium C14-17 Alkyl Sec Sulfonate[1] | 7 |
| Fatty acids, C12-18 and C18-unsaturated[2] | 7.5 |
| C12/14 fatty alcohol polyglycol ether with 7 mol EO[3] | 17 |
| Triethanolamine | 7.5 |
| Propylene Glycol | 11 |
| Citric acid | 6.5 |
| Potassium Hydroxyde | 9.5 |
| Protease | 0.2 |

TABLE 12-continued

Composition of the liquid detergent formulation

| Ingredients | Concentration [wt %] |
|---|---|
| Amylase | 0.2 |
| Mannanase | 0.2 |
| Acrylates/Steareth-20 Methacrylate structuring Crosspolymer[4] | 6 |
| Deionized Water | 27.4 |

[1] Hostapur SAS 60; Origin: Clariant
[2] Edenor K 12-18; Origin: Cognis
[3] Genapol LA 070; Origin: Clariant
[4] Aculyn 88; Origin: Dow Chemical Example 4

Rinse-Off Hair Conditioner Composition

A sufficient amount of microcapsule slurry A-D of the present invention was incorporated at the required dosage (corresponding to an encapsulated perfume oil at 0.5%) in the rinse-off base (see Table 13).

TABLE 13 rinse-off conditioner composition

| | Ingredients | Concentration [wt %] |
|---|---|---|
| A | Water deionized | 81.8 |
| | Behentrimonium Chloride [1] | 2.5 |
| | Hydroxyethylcellulose [2] | 1.5 |
| B | Cetearyl Alcohol [3] | 4 |
| | Glyceryl Stearate (and) PEG-100 Stearate [4] | 2 |
| | Behentrimonium Methosulfate (and) Cetyl alcohol (and) Butylene Glycol [5] | 4 |
| | Ethoxy (20) Stearyl Alcohol [6] | 1 |
| C | Amodimethicone (and) Trideceth-12 (and) Cetrimonium Chloride [7] | 3 |
| | Chlorhexidine Digluconate [8] 20% aqueous solution | 0.2 |
| D | Citric acid 10% aqueous sol. till pH 3.5-4 | q.s. |
| | TOTAL: | 100 |

[1] Genamin KDM P, Clariant
[2] Tylose H10 Y G4, Shin Etsu
[3] Lanette O, BASF
[4] Arlacel 165-FP-MBAL-PA-(RB), Croda
[5] Incroquat Behenyl TMS-50-MBAL-PA-(MH) HA4112, Croda
[6] SP Brij S20 MBAL-PA(RB), Croda
[7] Xiameter DC MEM-0949 Emulsion, Dow Corning
[8] Alfa Aesar Ingredients of Phase A are mixed until a uniform mixture was obtained. Tylose is allowed to completely dissolve. Then the mixture is heated up to 70-75° C. Ingredients of Phase B are combined and melted at 70-75° C. Then ingredients of Phase B are added to Phase A with good agitation and the mixing is continued until cooled down to 60° C. Then, ingredients of Phase C are added while agitating and keeping mixing until the mixture cooled down to 40° C. The pH is adjusted with citric acid solution till pH: 3.5-4.0.

Example 5

Spray-Dried Microcapsules Preparation

Emulsions 1-5 having the following ingredients are prepared.

TABLE 14

Composition of Emulsions 1-5 and composition of granulated powder 1-5 after spray-drying

| Ingredients | Emulsion 1 | Emulsion 2 | Emulsion 3 | Emulsion 4 | Emulsion 5 |
|---|---|---|---|---|---|
| Modified starch [1] | 2.6% | 2.6% | 2.6% | 12.5% | 2% |
| Maltodextrin [2] | 26.8% | 22.8% | 19.3% | 0% | 19.1% |
| Maltose [3] | 0% | 0% | 0% | 7.9% | 0% |
| Citric Acid | 0% | 0% | 0% | 1% | 0% |
| Tripotassium Citrate | 0% | 0% | 0% | 1.9% | 0% |
| Microcapsules A-D | 12.0% | 24% | 37.0% | 8.9% | 56.2% |
| Silica [4] | 1.1% | 1.1% | 1.1% | 0% | 0% |
| Free Perfume | 0% | 0% | 0% | 11% | 0% |
| Water | 57.6% | 49.6% | 40.1% | 56.9% | 22.7% |

| | Granule 1 | Granule 2 | Granule 3 | Granule 4 | Granule 5 |
|---|---|---|---|---|---|
| Modified starch [1] | 7.5% | 7.4% | 7.2% | 31.6% | 4.9% |
| Maltodextrin [2] | 77.4% | 65.5% | 53.8% | 0% | 44.7% |
| Maltose | 0% | 0% | 0% | 20.9% | 0% |
| Citric Acid | 0% | 0% | 0% | 2.6% | 0% |
| Tripotassium citrate | 0% | 0% | 0% | 4.9% | 0% |
| Encapsulated perfume | 0% | 0% | 0% | 28.1% | 0% |
| Microcapsules A-D | 12.% | 24.1% | 36.1% | 9.8% | 48.4% |
| Silica | 3.0 | 3.0% | 2.9% | 2.0% | 2% |
| Fragrance loading in powder after spray-drying | 10.1% | 20.1% | 30% | 35.8% | 40.2% |

[1] Capsul™, Ingredion
[2] Maltodextrin 10DE origin: Roquette
[3] Maltose, Lehmann & Voss
[4] Silica, Evonik Components for the polymeric matrix (Maltodextrin and Capsul™, or Capsul™, citric acid and tripotassium citrate) are added in water at 45-50° C. until complete dissolution.

For emulsion 4, free perfume C is added to the aqueous phase.

Microcapsules slurry is added to the obtained mixture. Then, the resulting mixture is then mixed gently at 25° C. (room temperature).

Granulated powder 1-5 are prepared by spray-drying Emulsion A-E using a Sodeva Spray Dryer (Origin France), with an air inlet temperature set to 215° C. and a throughput set to 500 ml per hour. The air outlet temperature is of 105° C. The emulsion before atomization is at ambient temperature.

Example 6

Liquid Scent Booster Composition

A sufficient amount of microcapsule slurry A-D is weighed and mixed in a liquid scent booster to add the equivalent of 0.2% perfume.

TABLE 15

Liquid scent booster composition

| | Amount (% wt) | | | | | |
|---|---|---|---|---|---|---|
| Ingredients | 1 | 2 | 3 | 4 | 5 | 6 |
| Water | 71.20% | 89.5% | 78.8% | 79.4% | 70% | 70% |
| Propylene glycol | 20.30% | — | — | — | 20% | 20% |
| Polyethylene glycol ethers of decyl alcohol[1] | 4.00% | 6% | | | | |
| Polyethylene glycol ether of Lauryl Alcohol[2] | | | | | 4.00% | 4.00% |
| alkyl polyglucoside C8-C10[3] | | | 8.30% | 7.7% | | |
| Deceth-3[1] | 1.50% | | | | | |
| Lauryl lactate | | | | 1% | | |
| Lauric acid | | 1.5% | 1.60% | | | |
| Glyceryl Caprylate | | | | | 3.00% | 3.00% |
| Fragrance | 3.00% | 3.0% | 3.00% | 3.00% | 3.00% | 0% |

[1] Deceth-8; trademark and origin: KLK Oleo
[2] Laureth-9; ; trademark and origin
[3] Plantacare 2000UP; trademark and origin: BASF Different ringing gel compositions are prepared (compositions 1-6) according to the following protocol.

In a first step, the aqueous phase (water), the solvent (propylene glycol) if present and surfactants are mixed together at room temperature under agitation with magnetic stirrer at 300 rpm for 5 min.

In a second step, the linker is dissolved in the hydrophobic active ingredient (fragrance) at room temperature under agitation with magnetic stirrer at 300 rpm. The resulting mixture is mixed for 5 min.

Then, the aqueous phase and the oil phase are mixed together at room temperature for 5 min leading to the formation of a transparent or opalescent ringing gel.

Example 7

Powder Detergent Composition

A sufficient amount of granules 1-5 is weighed and mixed in a powder detergent composition to add the equivalent of 0.2% perfume.

TABLE 16

Powder detergent composition

| Ingredients | Part |
|---|---|
| Anionic (Linear Alkyl Benzene Sulphonates) | 20% |
| Nonionics (Alcohol Ethoxylates (5-9 ethylene oxide) | 6% |
| Builders (zeolites, sodium carbonate) | 25% |
| Silicates | 6% |
| Sodium Sulphate | 35% |
| Others (Enzymes, Polymers, Bleach) | 7.5% |
| Spray-dried granule powder 1-5 | 0.5% |

Example 8

Concentrated all Purpose Cleaner Composition

A sufficient amount of microcapsule slurry A-D is weighed and mixed in a concentrated all-purpose cleaner composition to add the equivalent of 0.2% perfume.

TABLE 17 concentrated all-purpose cleaner composition

| Ingredients | Amount (% wt) | Function |
|---|---|---|
| Ethoxylated Alcohol (C9-C11, 8EO) [1] | 20 | Non-ionic surfactant |
| Sodium Dodecyl Benzene Sulfonate [2] | 16 | Anionic surfactant |
| Sodium Cumene Sulfonate [3] | 8 | Hydrotrope |
| Methyl chloro isothiazolinone Methyl isothiazolinone 3.3:1 [4] | 0.8% | preservative |
| Water | 55.9 | solvent |

[1] Neodol 91-8 ®; trademark and origin: Shell Chemical
[2] Biosoft D-40 ®; trademark and origin: Stepan Company
[3] Stepanate SCS ®; trademark and origin: Stepan Company
[4] Kathon CG ®; trademark and origin: Dow Chemical Company All ingredients are mixed together and then the mixture was diluted with water to 100%.

Example 9

Solid Scent Booster Composition

A sufficient amount of microcapsules in dried form is weighed and mixed with a solid scent booster composition to add the equivalent of 0.2% perfume.

TABLE 18

Salt-based solid scent booster compositions

| Ingredients | Part |
|---|---|
| Sodium chloride | 95 |
| Spray-dried granule powder 1-5 | 5 |

TABLE 19

Urea-based solid scent booster compositions

| Ingredients | Part |
|---|---|
| Urea (beads) | 86 |
| Spray-dried granule powder 1-5 | 8 |
| Bentonite | 3 |
| Perfume | 3 |

Example 10

Shampoo Composition

A sufficient amount of microcapsule slurry A-D is weighed and mixed in a shampoo composition to add the equivalent of 0.2% perfume.

TABLE 20

Shampoo composition

| | Ingredients | Concentration [wt %] |
|---|---|---|
| A | Water deionized | 44.4 |
| | Polyquaternium-10 [1] | 0.3 |
| | Glycerin 85% [2] | 1 |
| | DMDM Hydantoin [3] | 0.2 |
| B | Sodium Laureth Sulfate [4] | 28 |
| | Cocamidopropyl Betaine [5] | 3.2 |
| | Disodium Cocoamphodiacetate [6] | 4 |
| | Ethoxy (20) Stearyl Alcohol [6] | 1 |
| C | Sodium Laureth Sulfate [4] | 3 |
| | Glyceryl Laureate [7] | 0.2 |
| D | Water deionized | 1 |
| | Sodium Methylparaben [8] | 0.1 |
| E | Sodium Chloride 10% aqueous sol. | 15 |
| | Citric acid 10% aqueous sol. till pH 5.5-6 | q.s. |
| | Perfume | 0.5 |
| | TOTAL: | 100 |

[1] Ucare Polymer JR-400, Noveon
[2] Schweizerhall
[3] Glydant, Lonza
[4] Texapon NSO IS, Cognis
[5] Tego Betain F 50, Evonik
[6] Amphotensid GB 2009, Zschimmer & Schwarz
[7] Monomuls 90 L-12, Gruenau
[8] Nipagin Monosodium, NIPA Polyquaternium-10 is dispersed in water. The remaining ingredients of phase A are mixed separately by addition of one after the other while mixing well after each adjunction. Then this pre-mix is added to the Polyquaternium-10 dispersion and was mixed for 5 min. Then Phase B and the premixed Phase C (heat to melt Monomuls 90L-12 in Texapon NSO IS) are added. The mixture is mixed well. Then, Phase D and Phase E are added while agitating. The pH was adjusted with citric acid solution till pH: 5.5-6.0.

Example 11

Shampoo Composition

A sufficient amount of microcapsule slurry A-D is weighed and mixed in a shampoo composition to add the equivalent of 0.2% perfume.

TABLE 21

Shampoo composition

| | Ingredients | Concentration [wt %] |
|---|---|---|
| A | Water deionized | 45.97 |
| | Tetrasodium EDTA [1] | 0.05 |
| | Guar Hydroxypropyltrimonium Chloride [2] | 0.05 |
| | Polyquaternium-10 [3] | 0.075 |
| B | NaOH 10% aqueous sol. | 0.3 |
| C | Ammonium Lauryl Sulfate [4] | 34 |
| | Ammonium Laureth Sulfate [5] | 9.25 |
| | Cocamidopropyl Betaine [6] | 2 |
| | Dimethicone (&) C12-13 Pareth-4 (&) C12-13 Pareth-23 (&) Salicylic Acid [7] | 2.5 |
| D | Cetyl Alcohol [8] | 1.2 |
| | Cocamide MEA [9] | 1.5 |
| | Glycol Distearate [10] | 2 |

TABLE 21-continued

Shampoo composition

| | Ingredients | Concentration [wt %] |
|---|---|---|
| E | Methylchloroisothiazolinone & Methylisothiazolinone [11] | 0.1 |
| | D-Panthenol 75% [12] | 0.1 |
| | Water deionized | 0.3 |
| F | Sodium Chloride 25% aqueous sol. | 0.6 |
| | TOTAL: | 100 |

[1] EDETA B Powder, BASF
[2] Jaguar C14 S, Rhodia
[3] Ucare Polymer JR-400, Noveon
[4] Sulfetal LA B-E, Zschimmer & Schwarz
[5] Zetesol LA, Zschimmer & Schwarz
[6] Tego Betain F 50, Evonik
[7] Xiameter MEM-1691, Dow Corning
[8] Lanette 16, BASF
[9] Comperian 100, Cognis
[10] Cutina AGS, Cognis
[11] Kathon CG, Rohm & Haas
[12] D-Panthenol, Roche A premix comprising Guar Hydroxypropyltrimonium Chloride and Polyquaternium-10 are added to water and Tetrasodium EDTA while mixing. When the mixture is homogeneous, NaOH is added. Then, Phase C ingredients are added and the mixture was heat to 75° C. Phase D ingredients are added and mixed till homogeneous. The heating is stopped and temperature of the mixture is decreased to RT. At 45° C., ingredients of Phase E while mixing final viscosity is adjusted with 25% NaCl solution and pH of 5.5-6 is adjusted with 10% NaOH solution.

Example 12

Antiperspirant Spray Anhydrous Composition

A sufficient amount of microcapsule slurry microcapsule slurry A-D is weighed and mixed in an antiperspirant spray anhydrous composition to add the equivalent of 0.2% perfume.

TABLE 22 antiperspirant spray anhydrous composition

| Ingredient | Amount (wt %) |
|---|---|
| Cyclomethicone[1] | 53.51 |
| Isopropyl miristate | 9.04 |
| Silica[2] | 1.03 |
| Quatemium-18-Hectorite[3] | 3.36 |
| Aluminium Chlorohydrate[4] | 33.06 |

[1] Dow Corning ® 345 Fluid; trademark and origin: Dow Corning
[2] Aerosil ® 200; trademark and origin: Evonik
[3] Bentone ® 38; trademark and origin: Elementis Specialities
[4] Micro Dry Ultrafine; origin: Reheis Using a high speed stirrer, Silica and Quaternium-18-Hectorite are added to the Isopropyl miristate and Cyclomethicone mixture. Once completely swollen, Aluminium Chlorohydrate is added portion wise under stirring until the mixture was homogeneous and without lumps. The aerosol cans are filled with 25% Suspension of the suspension and 75% of Propane/Butane (2,5 bar).

Example 13

Antiperspirant Spray Emulsion Composition

A sufficient amount of microcapsule slurry microcapsule slurry A-D is weighed and mixed in antiperspirant spray emulsion composition to add the equivalent of 0.2% perfume.

TABLE 23 antiperspirant spray emulsion composition

| Ingredient | Amount (wt %) |
|---|---|
| Polysorbate 65[1] (Part A) | 0.95 |
| Polyglyceryl-2 dipolyhydroxystearate[2] (Part A) | 1.05 |
| Cetyl PEG/PPG-10/1 Dimethicone[3] (Part A) | 2.75 |
| Cyclomethicone[4] (Part A) | 16.4 |
| Isopropylisostearate[5] (Part A) | 4.5 |
| Phenoxyethanol[6] (Part A) | 0.5 |
| Ethylhexylglycerin[7] (Part A) | 0.2 |
| C12-15 Alkyl Benzoate[8] (Part A) | 5.65 |
| Silica Silylate[9] (Part A) | 0.1 |
| Sodium Methylparaben[10] (Part B) | 0.1 |
| Aluminium Chlorohydrate[11] (Part B) | 20 |
| Water (Part B) | 44.47 |
| Fragrance (Part C) | 3.33 |

[1] Tween 65; trademark and origin: CRODA
[2] Dehymuls PGPH; trademark and origin: BASF
[3] Abil EM-90; trademark and origin: BASF
[4] Dow Corning 345 fluid; trademark and origin: Dow Corning
[5] Crodamol ipis; trademark and origin: CRODA
[6] Phenoxyethanol; trademark and origin: LANXESS
[7] Sensiva sc 50; trademark and origin: KRAFT
[8] Tegosoft TN; trademark and origin: Evonik
[9] Aerosil R 812; trademark and origin: Evonik
[10] Nipagin mna; trademark and origin: CLARIANT
[11] Locron L; trademark and origin: CLARIANT The ingredients of Part A and Part B are weighted separately. Ingredients of Part A are heated up to 60° C. and ingredients of Part B are heated to 55° C. Ingredients of Part B are poured small parts while continuous stirring into A. Mixture were stirred well until the room temperature was reached. Then, ingredients of part C are added. The emulsion is mixed and is introduced into the aerosol cans. The propellant is crimped and added.

Aerosol filling: 30% Emulsion: 70% Propane/Butane 2,5 bar

Example 14

Deodorant Spray Composition

A sufficient amount of microcapsule slurry microcapsule slurry A-D is weighed and mixed in antiperspirant deodorant spray composition to add the equivalent of 0.2% perfume.

TABLE 24 deodorant spray composition

| Ingredient | Amount (wt %) |
|---|---|
| Ethanol 95% | 90.65 |
| Triclosan[1] | 0.26 |
| Isopropyl miristate | 9.09 |

[1] Irgasan ® DP 300; trademark and origin: BASF

All the ingredients according to the sequence of the Table above are mixed and dissolved. Then the aerosol cans are filled, crimp and the propellant is added (Aerosol filling: 40% active solution 60% Propane/Butane 2.5 bar).

Example 15

Antiperspirant Roll-on Emulsion Composition

A sufficient amount of microcapsule slurry microcapsule slurry A-D is weighed and mixed in antiperspirant roll-on emulsion composition to add the equivalent of 0.2% perfume.

TABLE 25 antiperspirant roll-on emulsion composition

| Ingredient | Amount (wt %) |
|---|---|
| Stearet-2[1] (Part A) | 3.25 |
| Stearet-21[2] (Part A) | 0.75 |
| PPG-15 Stearyl Ether[3] (Part A) | 4 |
| WATER deionised (Part B) | 51 |
| Aluminum Chlorohydrate 50% aqueous solution[4] (Part C) | 40 |
| Fragrance (Part D) | 1 |

[1]BRIJ 72; origin: ICI
[2]BRIJ 721; origin: ICI
[3]ARLAMOL E; origin: UNIQEMA-CRODA
[4]LOCRON L; origin: CLARIAN Part A and B are heated separately to 75° C.; Part A is added to part B under stirring and the mixture is homogenized for 10 minutes. Then, the mixture is cooled down under stirring; and part C is slowly added when the mixture reached 45° C. and part D when the mixture reached at 35° C. while stirring. Then the mixture is cooled down to RT.

Example 16

Antiperspirant Roll-on Composition

A sufficient amount of microcapsule slurry microcapsule slurry A-D is weighed and mixed in antiperspirant roll-on composition to add the equivalent of 0.2% perfume.

TABLE 26 antiperspirant roll-on composition

| Ingredient | QUANTITY |
|---|---|
| Water (Part A) | 45 |
| Aluminum Chlorohydrate 50% aqueous solution[1] (Part B) | 20 |
| Alcohol Denat. (Ethanol 96%) (Part B) | 30 |
| Ceteareth-12[2] (Part C) | 2 |
| Ceteareth-30[3] (Part C) | 2 |
| Fragrance (Part D) | 1 |

[1]LOCRON L; origin: CLARIANT
[2]EUMULGIN B-1; origin: BASF
[3]EUMULGIN B-3; origin: BASF The ingredients of part B are mixed in the vessel then ingredient of part A is added. Then dissolved part C in part A and B. With perfume, 1 part of Cremophor RH40 for 1 part of perfume is added while mixing well

Example 17

Antiperspirant Roll-on Composition

A sufficient amount of microcapsule slurry microcapsule slurry A-D is weighed and mixed in antiperspirant roll-on emulsion composition to add the equivalent of 0.2% perfume.

TABLE 27 antiperspirant roll-on emulsion composition

| Ingredient | Amount (wt %) |
|---|---|
| Water (Part A) | 50.51 |
| Hydroxyethylcellulose[1] (Part A) | 0.71 |
| Ethanol 95% (Part B) | 40.40 |
| 1,2-Propylene Glycol (Part B) | 5.05 |
| Triclosan[2] (Part B) | 0.30 |
| PEG-40 Hydrogenated castor oil[3] (Part C) | 3.03 |

[1]Natrosol ® 250 H; trademark and origin: Ashland
[2]Irgasan ® DP 300; trademark and origin: BASF
[3]Cremophor ® RH 40; trademark and origin: BASF Part A is prepared by sprinkling little by little the Hydroxyethylcellulose in the water whilst rapidly stirring with the turbine. Stirring is continued until the Hydroxyethylcellulose is entirely swollen and giving a limpid gel. Then, Part B is poured little by little in Part A whilst continuing stirring until the whole is homogeneous. Part C is added.

Example 18

Deodorant Pump without Alcohol Formulation

A sufficient amount of microcapsule slurry microcapsule slurry A-D is weighed and mixed in the following composition to add the equivalent of 0.2% perfume.

TABLE 28 deodorant composition

| Ingredients | Amount (wt %) |
|---|---|
| C12-15 Alkyl Lactate[1] | 5 |
| Dimethicone[2] | 91.6 |
| Cetyl Lactate[3] | 1 |
| Octyldodecanol[4] | 0.8 |
| Triclosan[5] | 0.1 |
| PERFUME | 1.5 |

[1]Ceraphyl 41; trademark and origin ASHLAND
[2]DOW CORNING 200 FLUID 0.65cs; trademark and origin DOW CORNING CORPORATION
[3]Ceraphyl 28; trademark and origin ASHLAND
[4]Eutanol G; trademark and origin BASF
[5]Irgasan ® DP 300; trademark and origin: BASF All the ingredients are mixed according to the sequence of the table and the mixture is heated slightly to dissolve the Cetyl Lactate.

Example 19

Deodorant Pump with Alcohol Formulation

A sufficient amount of microcapsule slurry microcapsule slurry A-D is weighed and mixed in the following composition to add the equivalent of 0.2% perfume.

TABLE 29 deodorant composition

| Ingredients | Amount (wt %) |
|---|---|
| Ethyl Alcohol (Part A) | 60 |
| PEG-6 Caprylic/Capric Glycerides[1] (Part A) | 2 |
| Water (Part A) | 35.6 |
| PEG-40 Hydrogenated Castor Oil[2] (Part B) | 0.4 |
| PERFUME (Part B) | 2 |

[1]Softigen 767; trademark and origin CRODA
[2]Cremophor ® RH 40; trademark and origin: BASF Ingredients from Part B are mixed together. Ingredients of Part A are dissolved according to the sequence of the Table and are poured into part B.

Example 20

Deodorant Stick without Alcohol Formulation

A sufficient amount of microcapsule slurry microcapsule slurry A-D is weighed and mixed in the following composition to add the equivalent of 0.2% perfume.

TABLE 30 deodorant composition

| Ingredient | Amount (wt %) |
|---|---|
| Stearic acid (Part A) | 5.05 |
| 1,2-propylene glycol (Part A) | 41.87 |
| Sodium hydroxide 20% aqueous solution (Part A) | 4.24 |
| Water (Part A) | 30.30 |
| Tetrasodium EDTA[1] (Part A) | 0.10 |
| Ceteareth-25[2] (Part A) | 1.52 |
| PPG-3 Myristyl ether[3] (Part A) | 1.52 |
| 1,2-propylene glycol (Part B) | 15.14 |
| Triclosan[4] (Part B) | 0.25 |

[1]Edeta ® B Power; trademark and origin: BASF
[2]Cremophor ® A25; trademark and origin: BASF
[3]Tegosoft ® APM; trademark and origin: Evonik
[4]Irgasan ® DP 300; trademark and origin: BASF All the components of Part A are weighted and heated up to 70-75° C. Ceteareth-25 is added once the other Part A ingredients are mixed and heated. Once the Ceteareth-25 is dissolved, the Stearic Acid is added. Part B is prepared by dissolving the Triclosan in 1,2 Propylene Glycol. Water which has evaporated is added. Slowly under mixing, Part B is poured into part A. To stock, a plastic bag into the bucket is put in to be sealed after cooling. Moulds was filled at about 70° C.

Example 21

Anti-Perspirant Stick

A sufficient amount of microcapsule slurry microcapsule slurry A-D is weighed and mixed in the following composition to add the equivalent of 0.2% perfume.

TABLE 31 deodorant composition

| Ingredient | Amount (wt %) |
|---|---|
| Cyclomethicone[1] (Part A) | 55.56 |
| Stearyl Alcohol[2] (Part A) | 21.21 |
| PPG-14 Butyl ether[3] (Part A) | 2.02 |
| Hydrogenated Castor Oil[4] (Part A) | 1.01 |
| Aluminium Zirconium tetrachloro-hydrexGly[5] (Part B) | 20.20 |

[1]Dow Corning ® 345 Fluid; trademark and origin: Dow Corning
[2]Lanette ® 18; trademark and origin: BASF
[3]Tegosoft ® PBE; trademark and origin: Evonik
[4]Cutina ® HR; trademark and origin: BASF
[5]Summit AZP-908; trademark and origin: Reheis All the components of Part A are weighted, heated up to 70-75° C. and mixed well. Ingredient of Part B is dispersed in Part A. The mixture is mixed and putted into a tick at 65° C.

Example 22

Day Cream

A sufficient amount of microcapsule slurry microcapsule slurry A-D is weighed and mixed in the following composition to add the equivalent of 0.2% perfume.

TABLE 32 day cream

| Ingredients | % |
|---|---|
| ARLATONE 985 Ethoxylated Fatty Alcohol Ester | 5.000 |
| CETYL ALCOHOL | 0.500 |
| TEFOSE 2561 Ceteth-20 (and) Glyceryl Stearate (and) PEG-6 Stearate (and) Steareth-20 | 4.000 |
| COSBIOL Squalan | 1.000 |
| MINERAL OIL 30-40 cp Paraffin Oil | 2.000 |
| PETROLEUM JELLY Petrolatum | 6.000 |
| WATER deionized | 75.850 |
| PROPYLENE GLYCOL | 5.000 |
| GLYDANT PLUS DMDM Hydantoin (and) Iodopropynyl Butylcarbamate | 0.150 |
| PNC 400 Sodium Carbomer | 0.200 |
| PERFUME | 0.300 |
| Total | 100.00 |

Example 23

Talc Formulation

A sufficient amount of granules 1-5 is weighed and mixed in introduced in a standard talc base: 100% talc, very slight characteristic odor, white powder, origin: LUZENAC to add the equivalent of 0.2% perfume.

Example 24

Shower-Gel Composition

A sufficient amount of microcapsule slurry microcapsule slurry A-D is weighed and mixed in the following composition to add the equivalent of 0.2% perfume.

TABLE 33 shower gel composition

| Ingredients | Amount (% wt) | Function |
| --- | --- | --- |
| WATER deionised | 49.350 | Solvent |
| Tetrasodium EDTA [1] | 0.050 | Chelating agent |
| Acrylates Copolymer[2] | 6.000 | Thickener |
| Sodium C12-C15 Pareth Sulfate [3] | 35.000 | Surfactant |
| Sodium Hydroxide 20% aqueous solution | 1.000 | pH adjuster |
| Cocamidopropyl Betaine[4] | 8.000 | Surfactant |
| Methylchloroisothiazolinone and Methylisothiazolinone[5] | 0.100 | Preservative |
| Citric Acid (40%) | 0.500 | pH adjuster |

[1] EDETA B POWDER; trademark and origin: BASF
[2] CARBOPOL AQUA SF-1 POLYMER; trademark and origin: NOVEON
[3] ZETESOL AO 328 U; trademark and origin: ZSCHIMMER & SCHWARZ
[4] TEGO-BETAIN F 50; trademark and origin: GOLDSCHMIDT
[5] KATHON CG; trademark and origin: ROHM & HASS Ingredients are mixed, pH is adjusted to 6-6.3 (Viscosity: 4500 cPo+/−1500 cPo (Brookfield RV/Spindle4/20 RPM)).

Example 25

Shower-Gel Composition

A sufficient amount of microcapsule slurry microcapsule slurry A-D is weighed and mixed in the following composition to add the equivalent of 0.2% perfume.

TABLE 34 shower gel composition

| Ingredients | Amount (% wt) | Function |
| --- | --- | --- |
| WATER deionized | 52.40 | Solvent |
| Tetrasodium EDTA [1] | 0.10 | Chelating agent |
| Sodium Benzoate | 0.50 | Preservative |
| Propylene Glycol | 2.00 | Solvent |
| Sodium C12-C15 Pareth Sulfate [2] | 35.00 | Surfactant |
| Cocamidopropyl Betaine[3] | 8.00 | Surfactant |
| Polyquaternium-7[4] | 0.20 | Conditioning agent |
| Citric Acid (40%) | 1.00 | pH adjuster |
| Sodium Chloride | 0.80 | Viscosity adjuster |

[1] EDETA B POWDER; trademark and origin: BASF
[2] ZETESOL AO 328 U; trademark and origin: ZSCHIMMER & SCHWARZ
[3] TEGO-BETAIN F 50; trademark and origin: GOLDSCHMIDT
[4] MERQUAT 550; trademark and origin: LUBRIZOL Ingredients are mixed, pH is adjusted to 4.5 (Viscosity: 3000 cPo+/−1500 cPo (Brookfield RV/Spindle #4/20 RPM)).

Example 26

Shower-Gel Composition

A sufficient amount of microcapsule slurry microcapsule slurry A-D is weighed and mixed in the following composition to add the equivalent of 0.2% perfume.

TABLE 35 shower gel composition

| Ingredients | Amount (% wt) | Function |
| --- | --- | --- |
| WATER deionized | 50.950 | Solvent |
| Tetrasodium EDTA [1] | 0.050 | Chelating agent |
| Sodium Benzoate | 0.50 | Preservative |
| Glycerin 86% | 3.50 | Solvent |
| Sodium Laureth Sulfate [2] | 27.0 | Surfactant |
| Polyquaternium-7[3] | 1.0 | Conditioning Agent |
| Coco-Betaine[4] | 6.0 | Surfactant |
| PEG-120 Methyl Glucose trioleate[5] | 1.0 | Thickener |
| Citric Acid (40%) | 1.0 | pH adjuster |
| Glycol Distearate & Laureth-4 & Cocamidopropyl Betaine[6] | 3.0 | Pearlizing agent |
| Sodium Chloride 20% | 5.0 | Viscosity adjuster |
| PEG-40 Hydrogenated Castor Oil[7] | 1.0 | Viscosity adjuster |

[1] EDETA B POWDER; trademark and origin: BASF
[2] Texapon NSO IS; trademark and origin: COGNIS
[3] MERQUAT 550; trademark and origin: LUBRIZOL
[4] DEHYTON AB-30; trademark and origin: COGNIS
[5] GLUCAMATE LT; trademark and origin: LUBRIZOL
[6] EUPERLAN PK 3000 AM; trademark and origin: COGNIS
[7] CREMOPHOR RH 40; trademark and origin: BASF Ingredients are mixed, pH is adjusted to 4.5 (Viscosity: 4000 cPo+/−1500 cPo (Brookfield RV/Spindle #4/20 RPM))

Example 27

Hair Coloration Composition

A sufficient amount of microcapsule slurry microcapsule slurry A-D is weighed and mixed with alkaline base A to add the equivalent of 0.2% perfume. 2 g of alkaline base A is then mixed with 2 g of the oxidative base B

TABLE 36

Composition of the alkaline base A

| Ingredients | % |
| --- | --- |
| Phase A | |
| Water | 39.13 |
| Carbomer [1] | 0.9 |
| p-phenylenediamine [2] | 1 |
| m-aminophenol [3] | 1 |
| m-phenylenediamine sulfate [4] | 0.07 |
| resorcinol [5] | 0.5 |
| Phase B | |
| Propylene glycol | 6 |
| Laureth-2 [6] | 6 |
| Laureth-12 [7] | 6 |
| Dimethicone [8] | 0.7 |
| Phase C | |
| Cetearyl alcohol [9] | 18 |
| Oleth-30 [10] | 3 |
| Lauric acid | 3 |
| Glycol distearate [11] | 3 |
| Phase D | |
| Sodium metabisulfite [12] | 0.4 |
| Silica dimethyl silyate | 0.3 |

TABLE 36-continued

| Composition of the alkaline base A | |
|---|---|
| Ingredients | % |
| Pentasodium pentetate [13] | 0.2 |
| Polyquaternium-22 [14] | 1 |
| Ammonium Hydroxide [15] | 9.3 |
| Perfume | 0.5 |

[1] Carbopol Ultrez 10 Polymer
[2] Covastyle PAP
[3] Covastyle MAP
[4] Covastyle MPDS
[5] Resorcine
[6] Lipocol L 12
[7] Arlypon F
[8] Dow Corning 200 Fluid 350
[9] Lanette O
[10] Eumulgin O 30
[11] Cutina AGS
[12] Covastyle MBS
[13] Dissolvine D-40
[14] Merquat 280
[15] Ammonium hydroxide 30% aqueous solution Procedure:

All ingredients of Phase A were mixed and heated until 75° C.

All ingredients of Phase B were combined and melt at 70-75° C.

Phase B was added to Phase A (both at 70-75° C.) with good agitation.

Phase C was added while mixing continued until cooled down to room temperature

At room temperature Phase D ingredients were added while mixing Remaining ingredients of Phase C were added under stirring.

TABLE 37

| Composition of the oxidative base B | |
|---|---|
| Ingredients | % |
| Phase A | |
| Water | 75 |
| Phase B | |
| Cetearyl alcohol and dicethyl phospahate and Cteteth-20 phosphate [1] | 3.5 |
| Mineral oil [2] | 3.5 |
| Cetyl acetate and acetylated lanolin alcohol [3] | 0.35 |
| Steareth-20 [4] | 0.35 |
| Phase C | |
| Hydrogen peroxide [5] | 17 |
| Perfume | 0.3 |

[1] Crodafos CS 20 Acid
[2] Paraffin Oil 30-40 cPs
[3] Acetulan
[4] Brij 78P
[5] Hydrogen Peroxide 35% aqueous solution Procedure:

All ingredients of Phase A were mixed and heated until 75° C.

All ingredients of Phase B were combined and melt at 70-75° C.

Phase B was added to Phase A (both at 70-75° C.) with good agitation and mixing continued until cooled down to room temperature At room temperature Phase C ingredients were added while mixing Example 28

Hand Dishwash

A sufficient amount of microcapsule slurry microcapsule slurry A-D is weighed and mixed in the following composition to add the equivalent of 0.2% perfume.

TABLE 38

| Hand dishwash composition | | |
|---|---|---|
| Ingredients | Amount (% wt) | Function |
| Linear alkylbenzene sulfonic acid [1] | 20 | Anionic surfactant |
| Diethanolamide [2] | 3.5 | Foam booster |
| Sodium Hydroxide (50%) [3] | 3.4 | pH Adjuster/neutralizer |
| Secondary alcohol ethoxolate [4] | 2.5 | Non-ionic surfactant |
| Sodium xylene sulfonate | 6.3 | Hydrotrope |
| Water | 64.3 | Solvent |

[1] Biosoft S-118 ®; trademark and origin: Stepan Company
[2] Ninol 40-CO ®; trademark and origin: Stepan Company
[3] Stepanate SXS ®; trademark and origin: Stepan Company
[4] Tergitol 15-S-9 ®; trademark and origin: Dow Chemical Company Water with sodium hydroxide and diethanolamide are mixed. LAS is added. After the LAS is neutralized, the remaining ingredients are added. The pH was Checked (=7-8) and adjusted if necessary.

Example 29

Toothpaste Formulation

A sufficient amount of microcapsule slurry R (corresponding to microcapsules microcapsule slurry A-D except that a flavor is encapsulated instead of a perfume) is weighed and mixed in the following composition to add the equivalent of 0.2% flavor.

TABLE 39

| Toothpaste formulation | |
|---|---|
| Ingredients | Amount (% wt) |
| Polyethylene glycol 400 | 2.0% |
| Xanthan Gum | 0.60% |
| Sorbitol 70% Solution | 50.0% |
| Sodium Fluoride | 0.220% |
| Sodium Benzoate | 0.20% |
| Water | 15.230% |
| Hydrated Silica[1] | 22.0% |
| Hydrated Silica[2] | 7.0% |
| Titanium Dioxide CI77891 | 0.500% |
| Sodium Lauryl Sulfate | 1.250% |
| Flavor | 1.20% |
| TOTAL | 100% |

[1] Tixosil 73; trademark and origin :
[2] Tixosil 43; trademark and origin :

Example 30

Dicalcium Phosphate Based Toothpaste Formulation

A sufficient amount of microcapsule slurry R (corresponding to microcapsules microcapsule slurry A-D except that a flavor is encapsulated instead of a perfume) is weighed and mixed in the following composition to add the equivalent of 0.2% flavor.

TABLE 40

| Toothpaste formulation | |
|---|---|
| Ingredients | Amount (% wt) |
| Sodium carboxymethyl cellulose | 1.20% |
| Flavor | 1.20% |
| DI/Purified Water | Q.S to Final Wt. |
| Sodium Lauryl Sulfate | 1.30% |
| Glycerine | 20.0% |
| Sodium Saccharin | 0.20% |
| Dicalcium phosphate dihydrate | 36.0% |
| Methylparaben | 0.200% |
| Silica[1)] | 3.0% |
| TOTAL | 100% |

[1)]Aerosil ®200; trademark and origin:

Example 31

Mouthwash Alcohol Free Formulation

A sufficient amount of microcapsule slurry R (corresponding to microcapsules microcapsule slurry A-D except that a flavor is encapsulated instead of a perfume) is weighed and mixed in the following composition to add the equivalent of 0.2% flavor.

TABLE 41

| Mouthwash formulation | |
|---|---|
| Ingredients | Amount (% wt) |
| Propylene Glycol | 10.0% |
| Flavor | 0.240% |
| DI/Purified Water | Q.S to Final Wt. |
| Poloxamer 407 NF | 0.240% |
| Sodium Lauryl Sulfate | 0.040% |
| Sorbitol 70% Solution | 10.0% |
| Sodium Saccharin | 0.030% |
| Glycerine | 3.0% |
| Sodium Benzoate | 0.10% |
| Sucralose | 0.020% |
| Benzoic Acid | 0.050% |
| TOTAL | 100% |

Example 32

Mouthwash Formulation

A sufficient amount of microcapsule slurry R (corresponding to microcapsules microcapsule slurry A-D except that a flavor is encapsulated instead of a perfume) is weighed and mixed in the following composition to add the equivalent of 0.2% flavor.

TABLE 42

| Mouthwash formulation | |
|---|---|
| Ingredients | Amount (% wt) |
| Ethyl Alcohol 190 Proof | 15.00% |
| Flavor | 0.24% |
| DI/Purified Water | Q.S to Final Wt. |
| Poloxamer 407 NF | 0.24% |
| Sodium Lauryl Sulfate | 0.04% |
| Sorbitol 70% Solution | 10.00% |
| Sodium Saccharin | 0.03% |

TABLE 42-continued

| Mouthwash formulation | |
|---|---|
| Ingredients | Amount (% wt) |
| Glycerine | 3.00% |
| Sodium Benzoate | 0.10% |
| Sucralose | 0.02% |
| Benzoic Acid | 0.05% |
| TOTAL | 100% |

The invention claimed is:

1. A delivery system comprising a carrier and a perfume formulation, wherein the perfume formulation comprises
    0 to 60 wt. % of a hydrophobic solvent, based on a total weight of the perfume formulation,
    40 to 100 wt. % of a perfume oil, based on the total weight of the perfume formulation, wherein the perfume oil has the following characteristics:
        at least 35% of perfuming ingredients having a log P above 3,
        at least 20% of Bulky materials of Groups 1 to 6, wherein Groups 1 to 6 are defined as follows:
            Group 1: perfuming ingredients comprising a cyclohexane, cyclohexene, cyclohexanone or cyclohexenone ring substituted with at least one 1 to 4 nodes-comprising substituent;
            Group 2: perfuming ingredients comprising a cyclopentane, cyclopentene, cyclopentanone or cyclopentenone ring substituted with at least one 4 or more nodes-comprising substituent;
            Group 3: perfuming ingredients comprising a phenyl ring or perfuming ingredients comprising a cyclohexane, cyclohexene, cyclohexanone or cyclohexenone ring substituted with at least one 5 or more nodes-comprising substituent, or with at least one phenyl substituent and optionally one or more 1 to 3 nodes comprising substituents;
            Group 4: perfuming ingredients comprising at least two fused or linked 5-membered or 6-membered rings;
            Group 5: perfuming ingredients comprising a camphor-like ring structure;
            Group 6: perfuming ingredients comprising at least one 7 to 20- membered ring,
            wherein nodes refers to any atoms which are able to provide at least two bonds to further atoms, as defined in the description, preferably 3 to 6 and
        at least 15% of high impact perfume materials having a Log T<−4,
    optionally, further hydrophobic active ingredients,
    wherein the perfume formulation is entrapped in the carrier, and
    wherein the delivery system is a core-shell microcapsule.

2. The delivery system according to claim 1, wherein the perfume oil and the hydrophobic solvent have at least two Hansen solubility parameters selected from the group consisting of: an atomic dispersion force (δD) from 12 to 20, a dipole moment (SP) from 1 to 8, and a hydrogen bonding (δH) from 2.5 to 11.

3. The delivery system according to claim 1, wherein the carrier is a biodegradable carrier.

4. The delivery system according to claim 1, wherein the carrier has a biodegradability of at least 60% within 60 days according to OECD301F.

5. The delivery system according to claim 1, wherein the delivery system is a core-shell microcapsule comprising: an oil-based core comprising the perfume formulation, and a composite shell comprising a first material and a second material, wherein the first material and the second material are different, the first material is selected from the group consisting of a coacervate, and the second material is selected from the group consisting of a polymeric material.

6. The delivery system according to claim 1, wherein the delivery system is a core-shell microcapsule comprising
an oil-based core comprising the perfume formulation;
an inner shell made of a polymerized polyfunctional monomer;
a biopolymer shell comprising a protein, wherein at least one protein is cross-linked.

7. The delivery system according to claim 1, wherein the delivery system is a core-shell microcapsule comprising
an oil-based core comprising the perfume formulation, and
a polyamide shell comprising:
an acyl chloride,
a first amino-compound being an amino-acid,
a second amino-compound selected from the group consisting of ethylene diamine, diethylene triamine, cystamine and mixtures thereof, and
a biopolymer selected from the group consisting of casein, sodium caseinate, bovin serum albumin, whey protein, and mixtures thereof.

8. A perfuming composition comprising
the delivery system according to claim 1 and
optionally, a free perfume oil.

9. The perfuming composition according to claim 8, wherein a total amount of the delivery system is 0.05 to 5 wt. %, based on a total weight of the perfuming composition, and a total amount of the free perfume oil is 0.05 to 5 wt. %, based on the total weight of the perfuming composition.

10. The perfuming composition according to claim 8, wherein a total amount of the perfume oil of the perfume formulation entrapped in the delivery system and a total amount of the free perfume oil are present in the perfuming composition in a weight ratio of 1:20 to 20:1.

11. A perfumed consumer product comprising the delivery system according to claim 1.

12. The perfumed consumer product according to claim 11, wherein the perfumed consumer product is a fine perfume, a splash or eau de perfume, a cologne, a shave or after-shave lotion, a liquid or solid detergent, a mono or multi chamber unidose detergent, a fabric softener, a fabric refresher, liquid or solid scent-boosters (PEG/urea or salts), a dryer sheet, an ironing water, a paper, a bleach, a carpet cleaner, curtain-care products, a shampoo, a coloring preparation, a color care product, a hair shaping product, a dental care product, a disinfectant, an intimate care product, a hair spray, a hair conditioning product, a vanishing cream, a deodorant or antiperspirant, a hair remover, a tanning or sun product, nail products, skin cleansing products, a makeup, a perfumed soap, shower or bath mousse, oil or gel, foot/hand care products, a hygiene product, an air freshener, a "ready to use" powdered air freshener, a mold remover, a furnisher care product, a wipe, a dish detergent or hard-surface detergent, a leather care product, or a car care product.

13. The perfumed consumer product according to claim 11, wherein the perfumed consumer product is a liquid or solid detergent, a fabric softener, liquid or solid scent-boosters (e.g. using PEG/urea or salts), a shampoo, a shower gel, a hair conditioning product (e.g. leave-on or rinse-off), a deodorant or an antiperspirant.

14. A delivery system comprising a carrier and a perfume formulation, wherein the perfume formulation comprises
0 to 60 wt. % of a hydrophobic solvent based on a total weight of the perfume formulation,
40 to 100 wt. % of a perfume oil, based on the total weight of the perfume formulation, wherein the perfume oil has the following characteristics:
0 at least 35% of perfuming ingredients having a log P above 3,
at least 20% of Bulky materials of Groups 3 to 6, wherein Groups 3 to 6 are defined as follows:
Group 3: perfuming ingredients comprising a phenyl ring or perfuming ingredients comprising a cyclohexane, cyclohexene, cyclohexanone or cyclohexenone ring substituted with at least one 5 or more nodes-comprising substituent, or with at least one phenyl substituent and optionally one or more 1 to 3 nodes-comprising substituents;
Group 4: perfuming ingredients comprising at least two fused or linked 5-membered or 6-membered rings;
Group 5: perfuming ingredients comprising a camphor-like ring structure;
Group 6: perfuming ingredients comprising at least one 7 to 20- membered ring,
wherein nodes refers to any atoms which are able to provide at least two bonds to further atoms, and
at least 15% of high impact perfume materials having a Log T<−4,
optionally, further hydrophobic active ingredients,
wherein the perfume formulation is entrapped in the carrier, and
wherein the delivery system is a core-shell microcapsule.

15. The delivery system according to claim 1, wherein the delivery system is a core-shell microcapsule comprising: an oil-based core comprising the perfume formulation, and a composite shell comprising a first material and a second material, wherein the first material and the second material are different, the first material is selected from the group consisting of a coacervate, and the second material is selected from the group consisting of polyurea, polyurethane, and mixtures thereof.

16. The delivery system according to claim 1, wherein the delivery system is a core-shell microcapsule comprising
an oil-based core comprising the perfume formulation;
an inner shell made of a polyisocyanate having at least two isocyanate functional groups; and
a biopolymer shell comprising a protein, wherein at least one protein is cross-linked.

17. The perfuming composition according to claim 8, wherein a total amount of the perfume oil of the perfume formulation entrapped in the delivery system and a total amount of the free perfume oil are present in the perfuming composition in a weight ratio of 10:1 to 1:10.

* * * * *